US010547716B2

(12) United States Patent
Jeon et al.

(10) Patent No.: US 10,547,716 B2
(45) Date of Patent: Jan. 28, 2020

(54) ELECTRONIC DEVICE FOR DETECTING OPENING AND CLOSING OF COVER DEVICE AND METHOD OF OPERATING SAME

(71) Applicant: Samsung Electronics Co., Ltd., Suwon-si, Gyeonggi-do (KR)

(72) Inventors: Jae-Woong Jeon, Suwon-si (KR); Han-Vit Kang, Suwon-si (KR); Hyung-Dal Kim, Yongin-si (KR); Seo-Yeon Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 15/843,285

(22) Filed: Dec. 15, 2017

(65) Prior Publication Data
US 2018/0176347 A1     Jun. 21, 2018

(30) Foreign Application Priority Data

Dec. 15, 2016 (KR) .......................... 10-2016-0172036

(51) Int. Cl.
*H04M 1/02* (2006.01)
*G06F 3/044* (2006.01)
(52) U.S. Cl.
CPC .......... *H04M 1/0245* (2013.01); *G06F 3/044* (2013.01)
(58) Field of Classification Search
CPC ........ G06F 3/041; G06F 3/044; H04M 1/024; H04M 1/185
See application file for complete search history.

(56) References Cited

U.S. PATENT DOCUMENTS

| 2013/0076614 | A1  | 3/2013 | Ive et al. |
| 2015/0035771 | A1  | 2/2015 | Park et al. |
| 2016/0085360 | A1* | 3/2016 | Deng ............... G06F 3/044 345/174 |
| 2016/0149571 | A1  | 5/2016 | Heimann et al. |
| 2016/0239148 | A1  | 8/2016 | Lee et al. |
| 2017/0123532 | A1  | 5/2017 | Zhao |

FOREIGN PATENT DOCUMENTS

| EP | 2 806 332 A2 | 11/2014 |
| KR | 10-2015-0016788 A | 2/2015 |
| KR | 10-1546949 B1 | 8/2015 |
| KR | 10-1587436 B1 | 1/2016 |
| KR | 10-2016-0016412 A | 2/2016 |
| WO | 2015/192338 A1 | 12/2015 |

* cited by examiner

*Primary Examiner* — Afroza Chowdhury
(74) *Attorney, Agent, or Firm* — Jefferson IP Law, LLP

(57) ABSTRACT

An electronic device is provided. The electronic device includes a sensor, a touch screen, and a processor that activates a first area corresponding to at least a part of the touch screen for determining whether a cover device mounted to the electronic device opens or closes, and determines whether the cover device opens or closes based on a touch input corresponding to a specific pattern included in the cover device, sensed through the activated first area of the touch screen, and based on information on whether the cover device is in proximity to the electronic device, sensed through the sensor.

20 Claims, 26 Drawing Sheets

ELECTRONIC DEVICE FOR DETECTING OPENING AND CLOSING OF COVER DEVICE AND METHOD OF OPERATING SAME

CROSS-REFERENCE TO RELATED APPLICATION(S)

This application claims the benefit under 35 U.S.C. § 119(a) of a Korean patent application filed on Dec. 15, 2016 in the Korean Intellectual Property Office and assigned Serial number 10-2016-0172036, the entire disclosure of which is hereby incorporated by reference.

TECHNICAL FIELD

The present disclosure relates to an electronic device for detecting opening and closing of a cover device and a method of operating the same.

BACKGROUND

According to the recent supply of portable smart phones, cover devices for protecting smart phones have also been widely supplied.

According to the related art, a cover device mounted to the smart phone includes a magnet, and the smart phone is able to detect opening and closing of the cover device through a hall sensor.

In the recent smart phone trend, most of the area of a front surface thereof is allocated as display area. As the display area of the smart phone become larger, it becomes more difficult to install a hall sensor on the front surface of the smart phone.

As the display area of the smart phone becomes larger, the display area on the front surface of the cover device also becomes larger. Accordingly, it is also difficult to mount the magnet on the front surface of the cover device.

Further, the smart phone has a problem in which the performance of an antenna installed in the smart phone is deteriorated due to the magnet included in the cover device according to the related art.

In accordance with another aspect of the present invention, a non-transitory computer-readable medium is provided. The non-transitory computer-readable medium stores a plurality of instructions for performing a method including activating a first area corresponding to at least a part of a touch screen included in the electronic device for determining whether a cover device mounted to the electronic device opens or closes; sensing a touch input corresponding to a specific pattern included in the cover device through the activated first area of the touch screen; determining whether the cover device is in proximity to the electronic device through a sensor included in the electronic device; and determining whether the cover device opens or closes based on the touch input and on whether the cover device is in proximity to the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method of operating the same for detecting whether a cover device opens or closes based on a touch pattern using a capacitive material included in the cover device mounted to the electronic device and information on whether the cover device is in proximity to the electronic device, sensed through a sensor.

In accordance with an aspect of the present disclosure, an electronic device is provided. The electronic device includes a sensor, a touch screen, and a processor configured to activate a first area corresponding to at least a part of the touch screen for determining whether a cover device mounted to the electronic device opens or closes, and determine whether the cover device opens or closes based on a touch input corresponding to a specific pattern included in the cover device sensed through the activated first area of the touch screen and based on information on whether the cover device is in proximity to the electronic device, sensed through the sensor.

In accordance with another aspect of the present disclosure, a method of operating an electronic device is provided. The method includes activating a first area corresponding to at least a part of a touch screen included in the electronic device for determining whether a cover device mounted to the electronic device opens or closes, sensing a touch input corresponding to a specific pattern included in the cover device through the activated first area of the touch screen, determining whether the cover device is in proximity to the electronic device through a sensor included in the electronic device, and determining whether the cover device opens or closes based on the touch input and whether the cover device is in proximity to the electronic device.

An electronic device according to an embodiment of the present disclosure has an effect of securing a display area on a front surface of the electronic device by determining whether a cover device opens or closes based on a touch pattern by a capacitive material included in the cover device mounted to the electronic device and information on whether the cover device is in proximity to the electronic device, sensed through a sensor.

Further, the electronic device according to an embodiment of the present disclosure has an effect of preventing performance deterioration of an antenna included in the electronic device and reducing the cost of the electronic device by removing a hall sensor from the existing electronic device and removing a magnet from the cover device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
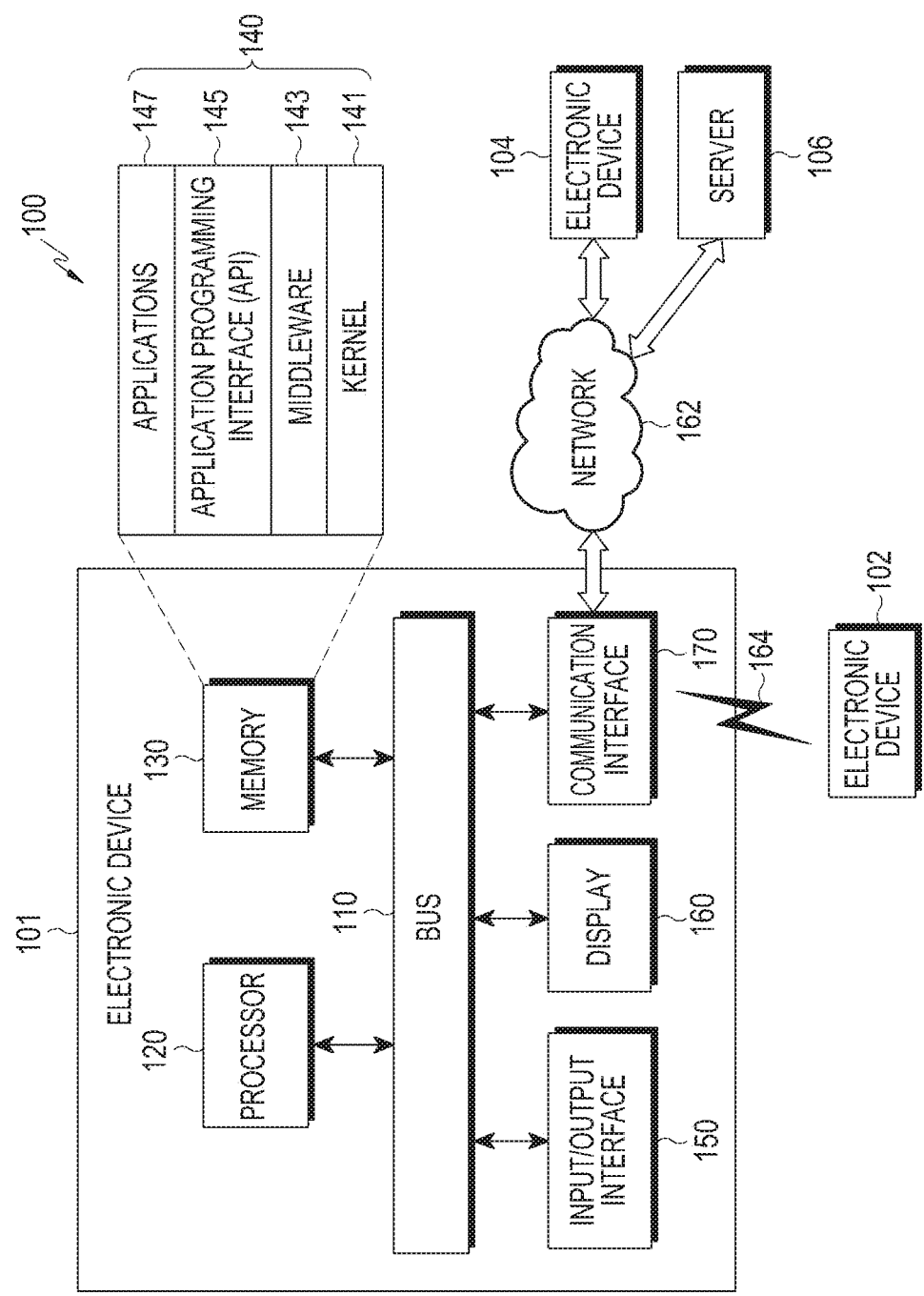
FIG. 1 is a block diagram illustrating an electronic device and a network according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

FIG. 1 is a block diagram illustrating an electronic device and a network according to various embodiments of the present disclosure.

Referring to FIG. 1, an electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements, or may further include other elements. The bus 110 may include, for example, a circuit that interconnects the elements 110 to 170 and transmits communication (for example, control messages or data) between the elements. The processor 120 may include one or more of a CPU, an AP, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an application programming interface (API) 145, and/or applications (or "apps") 147. At least some of the kernel 141, the middleware 143, and the API 145 may be referred to as an operating system (OS). The kernel 141 may control or manage system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the applications 147 may access the individual elements of the electronic device 101 to control or manage system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using the system resources (for example, the bus 110, the processor 120, the memory 130, or the like) of the electronic device 101 to one or more of the applications 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light-emitting diode (LED) display, an organic light-emitting diode (OLED) display, a micro electro mechanical system (MEMS) display, or an electronic paper display. The display 160 may display, for example, various types of content (for example, text, images, videos, icons, and/or symbols) for a user. The display 160 may include a touch screen and may receive, for example, a touch input, a gesture input, a proximity input, or a hovering input using an electronic pen or a part of the user's body. The communication interface 170, for example, may set communication between the electronic device 101 and an external device (for example, a first external electronic device 102, a second external electronic device 104, or a server 106). For example, the communication interface 170 may be connected to a network 162 or 164 through wireless or wired communication to communicate with the external device (for example, the second external electronic device 104 or the server 106).

The wireless communication may include, for example, cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth (BT), bluetooth low energy (BLE), Zig-Bee, nearfield communication (NFC), magnetic secure transmission, radio frequency (RF), and body area network (BAN). According to an embodiment, the wireless communication may include a GNSS. The GNSS may be, for example, a GPS, a global navigation satellite system (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), a plain old telephone service (POTS), and the like. The network 162 may include a telecommunications network, for example, at least one of a computer network (for example, a local area network (LAN) or a wide area network (WAN)), the Internet, and a telephone network.

Each of the first and second external electronic devices 102 and 104 may be of a type identical to or different from that of the electronic device 101. According to various embodiments, all or some of the operations executed by the electronic device 101 may be executed by another electronic device, a plurality of electronic devices (for example, the electronic devices 102 and 104), or the server 106. According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device may execute the requested functions or the additional functions, and may deliver the result of execution thereof to the electronic device 101. The electronic device 101 may provide the received result as it is or additionally process the received result and provide the requested functions or services. To achieve this, for example, cloud-computing, distributed-computing, or client-server-computing technology may be used.

Figure 2:
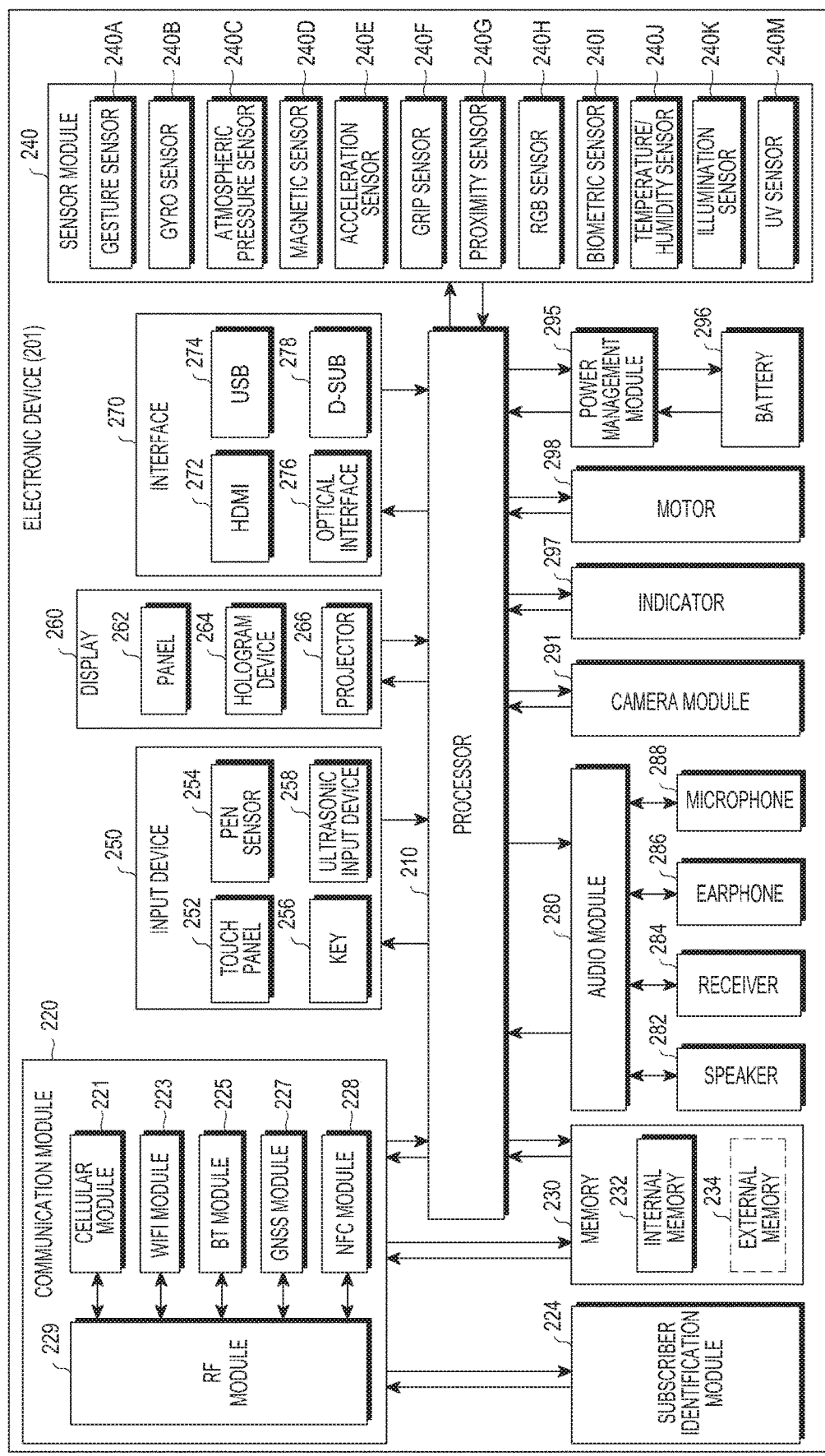
FIG. 2 is a block diagram of the electronic device according to various embodiments of the present disclosure.

FIG. 2 is a block diagram illustrating an electronic device 201 according to various embodiments of the present disclosure.

Referring to FIG. 2, the electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected to the processor 210 by running, for example, an OS or an application, and may perform processing and arithmetic operations of various types of data. The processor 210 may be implemented by, for example, a system on chip (SoC). According to an embodiment, the processor 210 may further include a graphic processing unit (GPU) and/or an image signal processor (ISP). The processor 210 may also include at least some of the elements illustrated in FIG. 2 (for example, a cellular module 221). The processor 210 may load, in volatile memory, instructions or data received from at least one of the other elements (for example, a non-volatile memory), process the loaded instructions or data, and store the resultant data in the non-volatile memory.

The communication module 220 may have a configuration identical or similar to that of the communication interface 170 illustrated in FIG. 1. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify or authenticate an electronic device 201 in the communication network using a subscriber identification module (for example, a subscriber identity module (SIM) card) 224. According to an embodiment, the cellular module 221 may perform at least some of the functions that the processor 210 may provide. According to an embodiment, the cellular module 221 may include a CP. In some embodiments, at least some (two or more) of the cellular module 221, the Wi-Fi module 223, the Bluetooth module 225, the GNSS module 227, and the NFC module 228 may be included in a single integrated chip (IC) or IC package. The RF module 229 may transmit/receive, for example, a communication signal (for example, an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the BT module 225, the GPS module 227, and the NFC module 228 may transmit/receive an RF signal through a separate RF module. The subscriber identification module 224 may include, for example, a card that includes a SIM and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a One-Time Programmable ROM (OTPROM), a PROM, an EPROM, an EEPROM, a mask ROM, a flash ROM, a flash memory, a hard disc drive, or a solid-state drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through any of various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240O a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may be, for example, at least one of a capacitive type, a resistive type, an infrared type, and an ultrasonic type. The touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 (for example, the display 160) may include a panel 262, a hologram device 264, a projector 266, and/or a control circuit for controlling the same. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure the strength of pressure of a user's touch. The pressure sensor may be implemented so as to be integrated with the touch panel 252, or may be implemented as one or more sensors separate from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) interface 278. The interface 270 may be included in, for example, the communication circuit 170 illustrated in FIG. 1. Additionally or alternatively, the interface 270 may, for example, include a mobile high-definition link (MHL) interface, a SD card/multi-media card (MMC) interface, or an infrared data association (IrDA) standard interface.

The audio module 280 may bi-directionally convert, for example, a sound and an electric signal. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an ISP, or a flash (for example, an LED or a xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, a remaining charge of the battery 296, and a voltage, a current, or a temperature while charging. The battery 296 may include, for example, a rechargeable battery or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. According to various embodiments, the electronic device (for example, the electronic device 201) may not include some elements, or may further include additional elements. Some of the elements may be coupled to constitute one object, but the electronic device may perform the same functions as those of the corresponding elements before being coupled to each other.

The term "module" as used herein may include a unit consisting of hardware, software, or firmware, and may, for example, be used interchangeably with the term "logic", "logical block", "component", "circuit", or the like. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 3A:
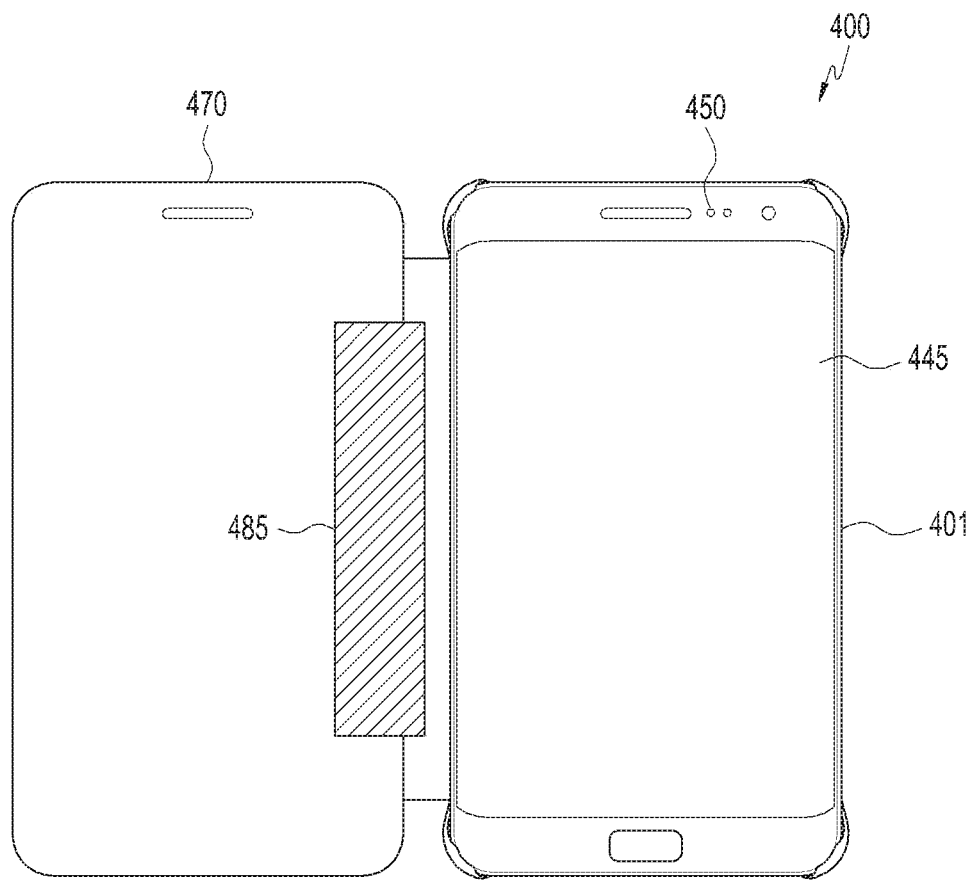
FIGS. 3A, 3B, and 3C are block diagrams schematically illustrating an electronic system according to various embodiments of the present disclosure.

FIG. 3A is a schematic block diagram illustrating an electronic system according to various embodiments of the present disclosure.

Referring to FIG. 3A, an electronic system 400 may include an electronic device 401 and a cover device 470 mounted to the electronic device 401.

The electronic device 401 may be implemented to be substantially the same as or similar to the electronic devices 101 and 201 illustrated in FIGS. 1 and 2. For example, the electronic device 401 may be implemented as a smart phone.

The electronic device 401 may include a touch screen 445 and a sensor 450.

In some embodiments, the electronic device 401 may detect opening and closing of the cover device 470 through the touch screen 445 and the sensor 450.

The cover device 470 may include a capacitive material 485 having a specific pattern. For example, the cover device 470 may have the capacitive material 485 having the specific pattern therein.

For example, the specific pattern may be a unique pattern or a specific shape including the capacitive material 485 so as to distinguish the same from a touch by a human body. For example, the specific pattern may be implemented in a barcode type. That is, the specific pattern may be a pattern including the capacitive material 485.

The capacitive material 485 may mean a conductive material. For example, the capacitive material 485 may be implemented by a transparent electrode material. For example, the capacitive material 485 may include indium tin oxide (ITO), metal mesh, and/or silver nanowire (AG NW).

Referring to FIG. 3A, the capacitive material 485 may be located in a partial area of a first cover part of the cover device 470 and a partial area of a connection part that connects the first cover part and a second cover part. Meanwhile, referring to FIG. 3B, a capacitive material 485-1 may be located in a partial area of the first cover part of the cover device 470.

Figure 3B:
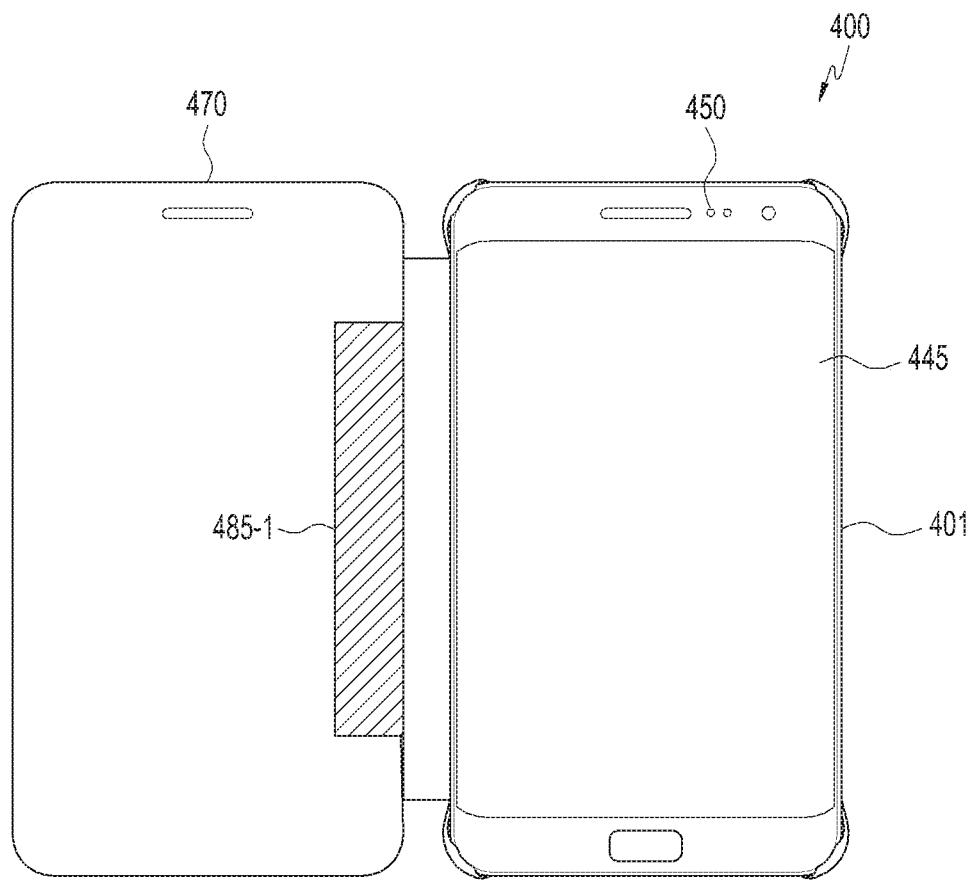
Figure 3C:
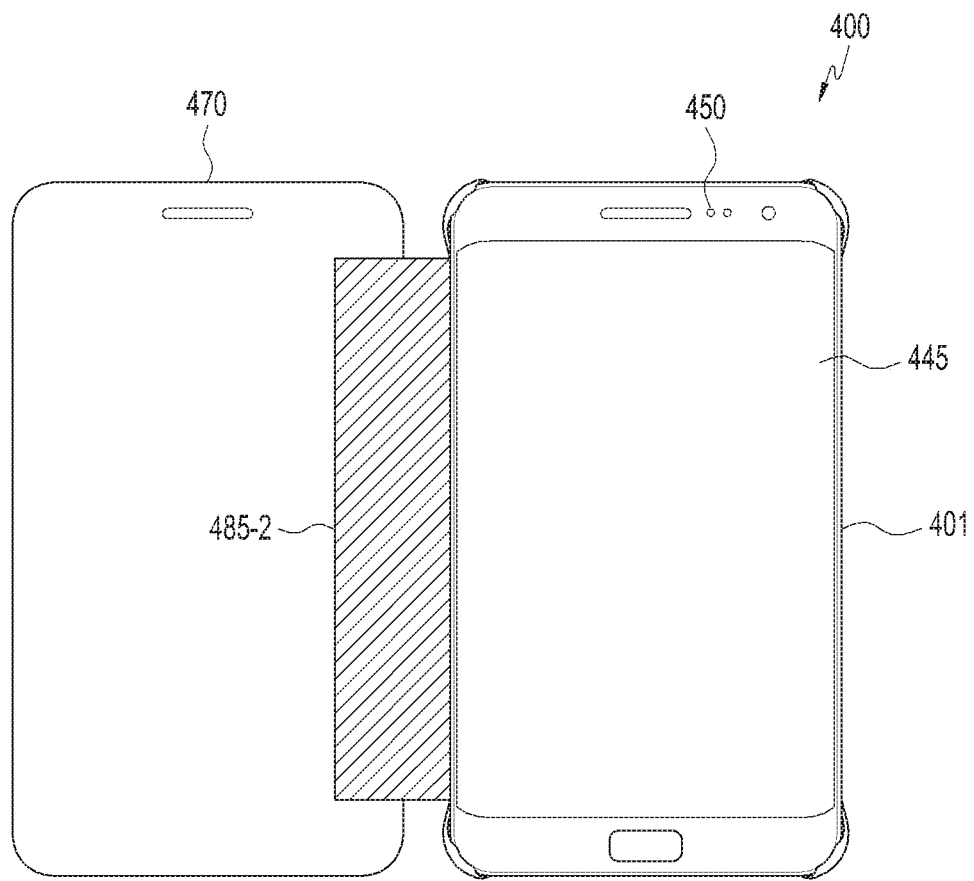

Referring to FIG. 3C, a capacitive material 485-2 may be located in a partial area of the first cover part of the cover device 470 and an entire area of the connection part that connects the first cover part and the second cover part.

Although FIGS. 3A to 3C illustrate that the capacitive materials 485, 485-1, and 485-2 are located at particular positions for convenience of description, the technical idea of the present disclosure is not limited thereto, and the capacitive materials 485, 485-1, and 485-2 according to the present disclosure may be located at any position within the cover device 470 at which opening and closing of the cover device 470 can be determined.

Hereinafter, for convenience of description, it is assumed that the capacitive material is located at a position which is the same as that illustrated in FIG. 3A. However, the technical idea of the present disclosure is not limited thereto.

In some embodiments, when the cover device 470 closes over the electronic device 401, the touch screen 445 may receive a touch input corresponding to the capacitive material 485. Further, the sensor 450 may detect whether the first cover part of the cover device 470 that directly faces the electronic device 401 is in proximity to the sensor 450. For example, the electronic device 401 may detect opening and closing of the cover device 470 based on the touch input corresponding to the capacitive material 485 and whether the first cover part is in proximity to the electronic device 401.

Figure 4:
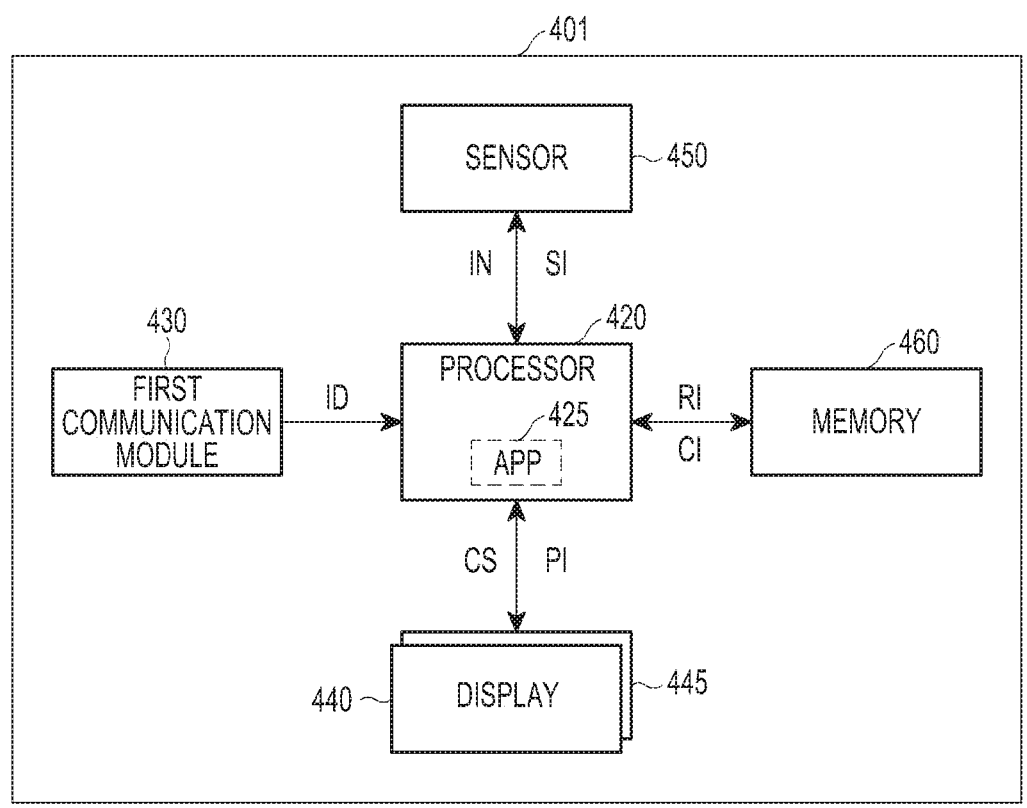
FIG. 4 is a block diagram illustrating the electronic device of FIG. 3A in detail according to various embodiments of the present disclosure.

FIG. 4 is a block diagram illustrating the electronic device of FIG. 3A in detail according to various embodiments of the present disclosure.

Referring to FIG. 4, an electronic device 401 may include a processor 420, a first communication module 430, a display 440, a touch screen 445, a sensor 450, and a memory 460.

The processor 420 may control the overall operation of the electronic device 401.

The processor 420 may operate the electronic device 401 in at least one state between an active mode, in which an entire area of the touch screen 445 is activated, and a power-saving mode, in which only a first area, which is part of the touch screen 445, is activated. For example, when it is determined that the cover device 470 opens, the processor 420 may operate the electronic device 401 in the active mode. Further, when it is determined that the cover device 470 closes, the processor 420 may operate the electronic device 401 in the power-saving mode.

In some embodiments, the processor 420 may activate a touch panel in the first area corresponding to at least the part of the touch screen 445 in order to detect opening and closing of the cover device 470 mounted to the electronic device 401.

For example, the first area may refer to at least a partial area set in the touch screen 445 to determine whether the cover device 470 opens or closes.

In some embodiments, the processor 420 may detect a touch input corresponding to the specific pattern included in the cover device 470 through the first area of the activated touch screen 445. Further, the processor 420 may detect whether the cover device 470 is in proximity to the electronic device 401 through the sensor 450. The processor 420 may detect opening and closing of the cover device 470 based on the touch input corresponding to the specific pattern and whether the cover device 470 is in proximity to the electronic device 401.

In some embodiments, the processor 420 may detect opening and closing of the cover device 470 based on a change in capacitance corresponding to the touch input of the specific pattern of the cover device 470. For example, when the first cover part of the cover device 470 closes, the processor 420 may receive (or detect) a touch input for the specific pattern located on the first cover part through the touch screen 445. At this time, the processor 420 may detect the change in capacitance corresponding to the touch input of the specific pattern through the touch screen 445. The processor 420 may determine whether the first cover part included in the cover device 470 opens or closes based on the change in capacitance corresponding to the touch input of the specific pattern.

In some embodiments, the processor 420 may detect opening and closing of the cover device 470 based on a location of the first area, in which the specific pattern is detected, and a change in capacitance for the location. That is, the processor 420 may compare whether the location of the first area, in which the specific pattern is detected, and the change in capacitance generated at the location match a reference pattern (CI) and detect opening and closing of the cover device 470 according to the result of the comparison. At this time, depending on the cover device 470, the CI may include a size, a shape, and a location of the specific pattern, and/or a value of the change in capacitance generated at the location.

The processor 420 may detect opening and closing of the cover device 470 based on capacitance changes (capacitance change amounts) for areas within a predetermined range based on the center of the first area of the touch screen 445.

The processor 420 may execute an application 425. For example, the application 425 may be an application for detecting opening and closing of the cover device 470. Meanwhile, for convenience of description, the operation of the electronic device 401 by the application 425 will be described as the operation of the processor 420 hereinafter.

The first communication module 430 may transmit data to the cover device 470 and receive data therefrom. For example, the first communication module 430 may be implemented as an NFC communication module.

In some embodiments, the first communication module 430 may receive registration information (ID) of the cover device 470. Further, the first communication module 430 may transmit the ID to the processor 420. For example, the ID may include information on the cover device 470. The information on the cover device 470 may include genuine product certification information and/or information on a specific pattern of the cover device 470 (for example, a shape, size, location, and/or capacitance change of the specific pattern).

The processor 420 may set a first area of the touch screen 445 based on the ID. Further, the processor 420 may set a CI for a capacitance change (or a capacitance change amount) corresponding to a touch input of the specific pattern based on the ID. The CI may refer to a pattern to be compared with a touch input of a specific pattern sensed through the touch screen 445. For example, the CI may mean a pattern having a shape, size, and/or location that is substantially the same as the specific pattern of the cover device 470.

The display 440 may display an image under the control of the processor 420. The display 440 may include the touch screen 445.

The touch screen 445 may receive a touch input corresponding to the specific pattern of the cover device 470. Further, the touch screen 445 may acquire a capacitance change corresponding to the touch input of the specific pattern. For example, the touch screen 445 may acquire pattern information (PI) for the acquired capacitance change (hereinafter, referred to as PI). The touch screen 445 may transmit the PI for detecting opening and closing of the cover device to the processor 420.

The touch screen 445 may receive a control signal (CS) from the processor 420. The touch screen 445 may activate a first area corresponding to at least a part of the entire touch area in response to the CS. Further, the touch screen 445 may activate only a touch panel corresponding to the first area, which is at least the part of the entire touch area, in response to the CS.

The sensor 450 may sense whether the cover device 470 is in proximity to the sensor 450 and acquire sensing information (SI) corresponding to the proximity. The sensor 450 may transmit the SI to the processor 420. The SI may include a value indicating whether the cover device 470 is in proximity to the sensor 450. For example, the SI may include a proximity signal quantitatively indicating the distance to the sensor 450.

For example, the sensor 450 may be implemented as a proximity sensor, an illumination sensor, and/or a proximity light sensor.

In some embodiments, when the touch input of the specific pattern is sensed, the processor 420 may transmit an interrupt signal (IN) for activating the sensor 450 to the sensor 450. The IN may be a signal for activating the sensor 450 in order to sense whether the cover device 470 is in proximity to the sensor 450.

Meanwhile, the processor 420 may compare SI (for example, a proximity signal) corresponding to the proximity level sensed through the sensor 450 with a reference value (RI) and determine whether the cover device 470 is in proximity to the electronic device 401 based on the result of the comparison. For example, the RI may be a value which is a standard of the proximity level sensed by the sensor 450. At this time, the RI may be determined according to the type of the cover device 470 and/or the electronic device 401.

The memory 460 may store data under the control of the processor 420.

In some embodiments, the memory 460 may store the RI. Further, the memory 460 may store a CI for a capacitance change. Further, the memory 460 may store the application 425.

The CI may refer to a pattern to be compared with the touch input of the specific pattern sensed through the touch screen 445. For example, the CI may refer to a pattern having a shape, size, and/or location that is substantially the same as the specific pattern of the cover device 470.

The memory 460 may transmit the RI and/or the CI to the processor 420 under the control of the processor 420.

Figure 5:
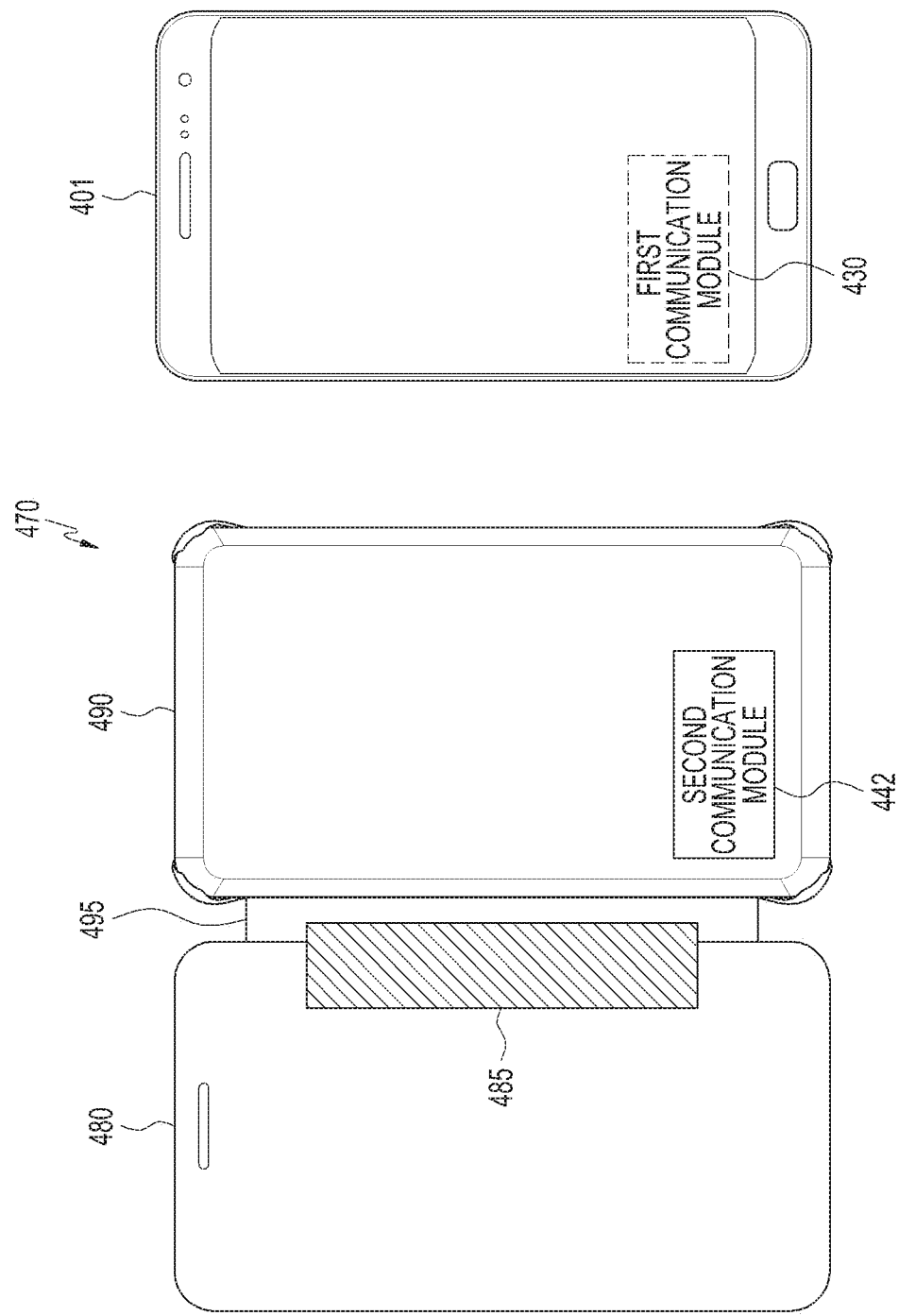
FIG. 5 is a block diagram schematically illustrating the cover device of FIG. 3A according to various embodiments of the present disclosure.

FIG. 5 is a block diagram schematically illustrating the cover device of FIG. 3A according to various embodiments of the present disclosure.

Referring to FIG. 5, the cover device 470 may include a first cover part 480, a second cover part 490, and a connection part 495.

The first cover part 480 may mean a cover part corresponding to a first side of the electronic device 401.

The first cover part 480 may include a specific pattern containing a capacitive material. For example, when the first cover part 480 closes over the electronic device 401, the specific pattern may perform a touch on the touch screen 445.

An upper area of the first cover part 480 may include an opaque area to sense the proximity of the cover device. For example, when the first cover part 480 closes over the electronic device 401, the opaque area of the first cover part 480 may be sensed by the sensor 450.

The opaque area may be located in an area of the first part 480 corresponding to the location of the sensor 450. For example, the opaque area may include a material that reflects light from the inside thereof, such as an opaque film and/or a polarizing film.

The second cover part 490 may mean a cover part corresponding to a second side of the electronic device 401. For example, the second cover part 490 may be located on a second side of the electronic device 401.

The second cover part 490 may include a second communication module 442.

The second communication module 442 may correspond to the first communication module 430 of the electronic device 401.

The second communication module 442 may transmit and receive data through the same communication scheme as that of the first communication module 430. Further, the second communication module 442 may be located at a position corresponding to the first communication module 430 of the electronic device 401. For example, the second communication module 442 may be implemented as an NFC communication module.

The second communication module 442 may transmit ID including information on the cover device to the first communication module 430 of the electronic device 401. For example, the information on the cover device 470 may include information on the capacitive pattern 485 and/or information on the first area of the touch screen 445 for receiving the capacitive pattern 485.

The connection part 495 may connect the first cover part 480 and the second cover part 490. The connection part 495 may be implemented as a means for connecting the first cover part 480 and the second cover part 490. For example, the connection part 495 may be implemented using a flexible material or a hard material.

Figure 6:
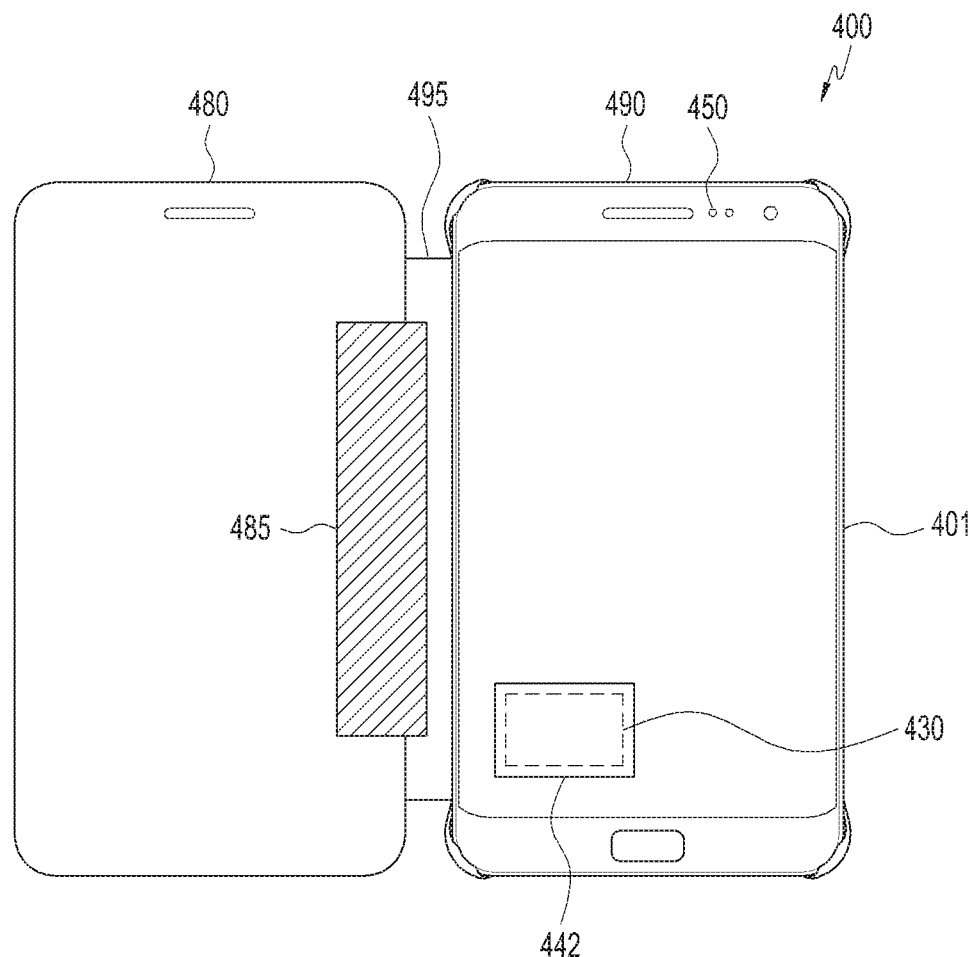
FIG. 6 is a block diagram illustrating the electronic device of FIG. 3A and the cover device mounted thereto according to various embodiments of the present disclosure.

FIG. 6 is a block diagram illustrating the electronic device of FIG. 3A and the cover device mounted thereto according to various embodiments of the present disclosure.

Referring to FIG. 6, the electronic device 401 may be mounted to the cover device 470. For example, the processor 420 may determine whether the electronic device 401 is mounted to the cover device 470 through the first communication module 430. When a signal indicating that the electronic device 401 is mounted to the cover device 470 is received from the second communication module 442 through the first communication module 430, the processor 420 may determine that the electronic device 401 is mounted to the cover device 470.

For example, the first communication module 430 and the second communication module 442 may be implemented as short-range communication modules. When the first communication module 430 and the second communication module 442 are within a predetermined range (for example, when they contact each other or are located at a close distance from each other), the first communication module 430 may receive the signal indicating whether the electronic device 401 is mounted to the cover device 470 from the second communication module 442. Accordingly, the processor 420 may determine that the electronic device 401 is mounted to the cover device 470.

When the electronic device 401 is mounted to the cover device 470, the processor 420 may receive ID of the cover device 470 from the second communication module 442 through the first communication module 430.

The processor 420 may set a first area of the touch screen 445 to be activated based on the ID. For example, the processor 420 may determine a location (or an area) on the touch panel of the touch screen 445 to be activated based on the ID. Further, the processor 420 may set a CI for a capacitance change to detect opening and closing of the cover device 470 based on the ID.

The processor 420 may sense a touch input of the specific pattern for the first area 447 of the cover device 470 and compare a capacitance change corresponding to the touch input with the CI. The processor 420 may detect opening and closing of the cover device 470 based on the result of the comparison.

Figure 7A:
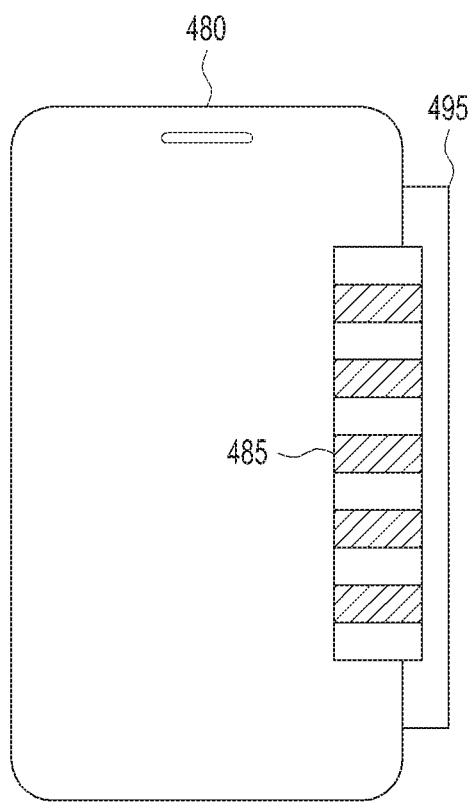
FIG. 7A is a block diagram illustrating a conductive material having a specific pattern according to various embodiments of the present disclosure.

FIG. 7A is a block diagram illustrating a conductive material having a specific pattern according to various embodiments of the present disclosure.

Referring to FIG. 7A, the first cover part 480 and the connection part 495 of the cover device 470 may include the specific pattern including the capacitive material 485 (or a conductive material).

Although FIG. 7A illustrates that the specific pattern including the capacitive material is located on portions of the areas of the first cover part 480 and the connection part 495, the present disclosure is not limited thereto, and the specific pattern may be located within various areas of the cover device 470.

The specific pattern may be implemented as a regular pattern or an irregular pattern. For example, the specific pattern may include a barcode-type pattern. Further, the specific pattern may be implemented in a specific shape.

The specific pattern may be located in a partial area of the first cover part 480. Further, the specific pattern may be located in a partial area of the connection part 495. For example, the specific pattern may be located on the first cover part 480 and the connection part 490 in a horizontal direction or a vertical direction. Further, the specific pattern may be implemented on the first cover part 480 and the connection part 490 in the form of a continuous or discontinuous pattern.

Figure 7B:
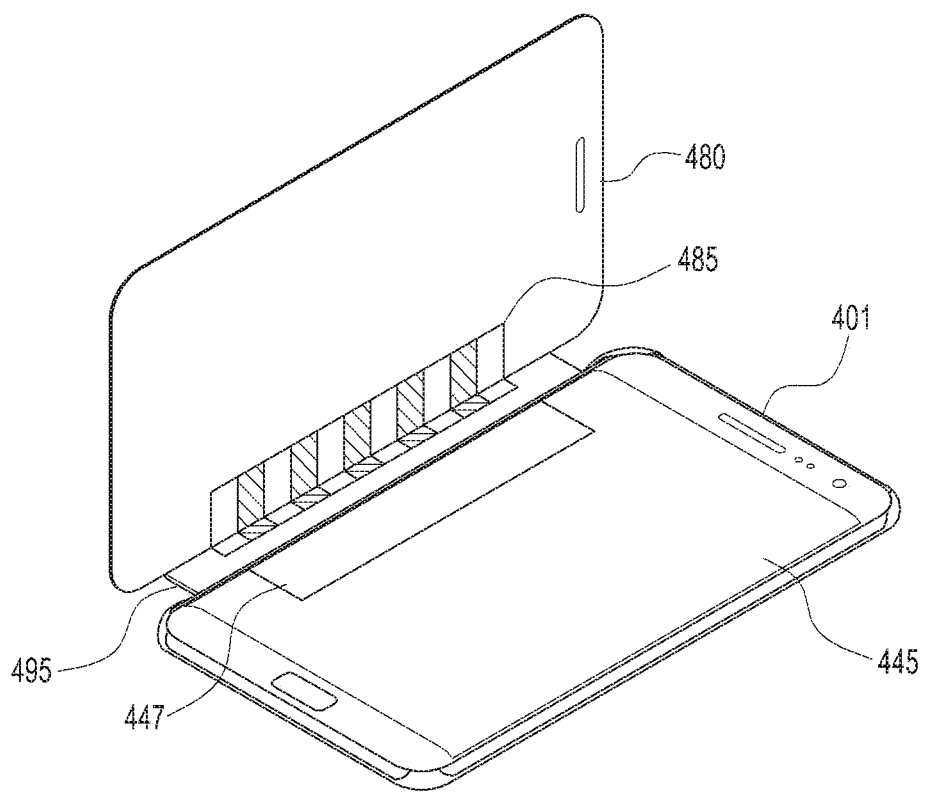
FIG. 7B is a block diagram illustrating a first area corresponding to a part of an activated touch screen according to various embodiments of the present disclosure.

FIG. 7B is a block diagram illustrating a first area corresponding to a part of the activated touch screen according to various embodiments of the present disclosure.

Referring to FIG. 7B, the processor 401 may activate the first area 447 of the touch screen 445.

In some embodiments, the processor 401 may activate the first area 447 of the touch screen 445 corresponding to the specific pattern of the first cover part 480. For example, the operation of the first area 447 of the touch screen 445 by the processor 420 may be an operation of activating a function for sensing a touch in order to sense a touch input on the first area 447 of the touch screen 445.

Meanwhile, the processor 420 may activate the touch panel of the first area 447 within the touch screen 445 based on the location or size of the specific pattern of the cover device 470. For example, the processor 420 may activate the first area 447 of the touch screen 445 having the location and size corresponding to the location and size of the specific pattern of the cover device 470.

For example, when coordinates of an entire area of the touch screen 445 are implemented as x1 to x100 in a horizontal direction and y1 to y100 in a vertical direction, the processor 401 may activate the touch panel in an area having a coordinate of x1 to x3 in the horizontal direction and having a coordinate of y10 to y90. That is, the processor 420 may reduce power consumption of the electronic device 401 by activating only the touch panel in the first area 447 rather than the entire area of the touch screen 445. For example, the processor 420 may operate the electronic device 401 in a power-saving mode in which only the touch panel in the first area 447, rather than the entire area of the touch screen 445, is activated.

In some embodiments, the processor 420 may activate the first area 447 based on ID received through the first communication module 430. For example, the processor 420 may acquire information on the location and size of the specific pattern of the cover device 470 included in the ID and activate the first area 447 based on the acquired information on the location and size of the specific pattern.

Figure 7C:
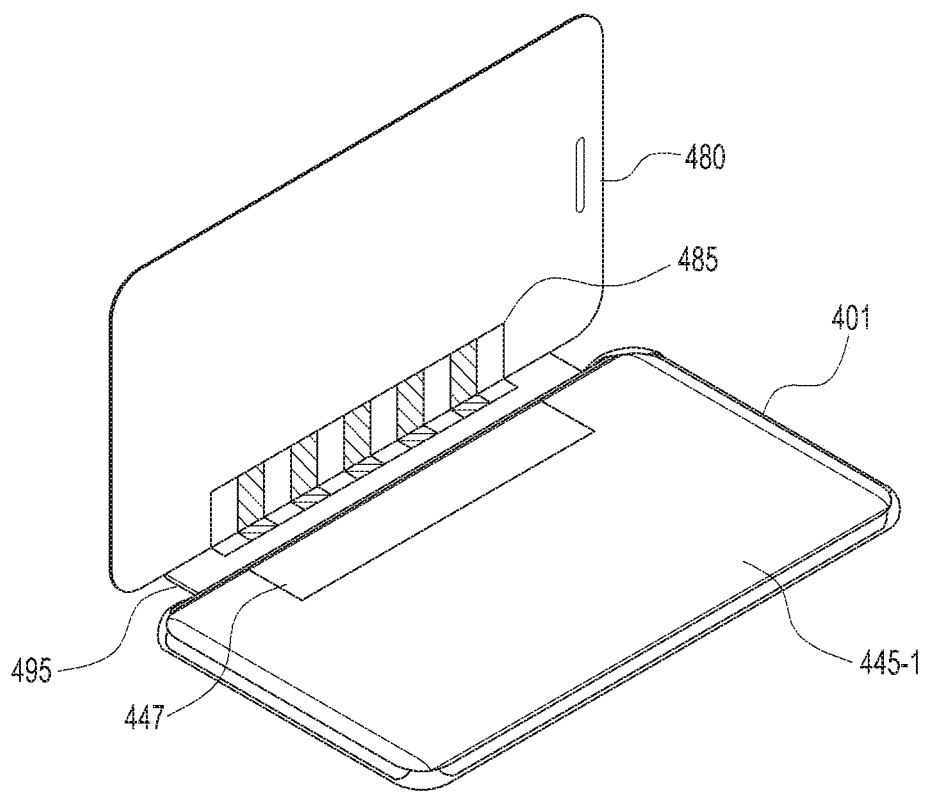
FIG. 7C is a block diagram illustrating a first area corresponding to a part of the activated touch screen according to various embodiments of the present disclosure.

FIG. 7C is a block diagram illustrating a first area corresponding to a part of the activated touch screen according to various embodiments of the present disclosure.

Referring to FIG. 7C, the processor 401 may activate the first area 447 of the touch screen 445.

The electronic device 401 may include a front display 440. For example, the processor 401 may activate the touch panel in the first area 447 of the touch screen 445-1 corresponding to the specific pattern of the first cover part 480.

Although FIGS. 7A to 7C illustrate a part corresponding to the capacitive material in the specific pattern as being shaded for convenience of description, the capacitive material may be implemented to be colored or transparent. Further, although FIGS. 7A to 7C illustrate the specific pattern in the vertical direction for convenience of description, the location, size, shape, color, and/or transparency of the specific pattern are not limited thereto.

Figure 8:
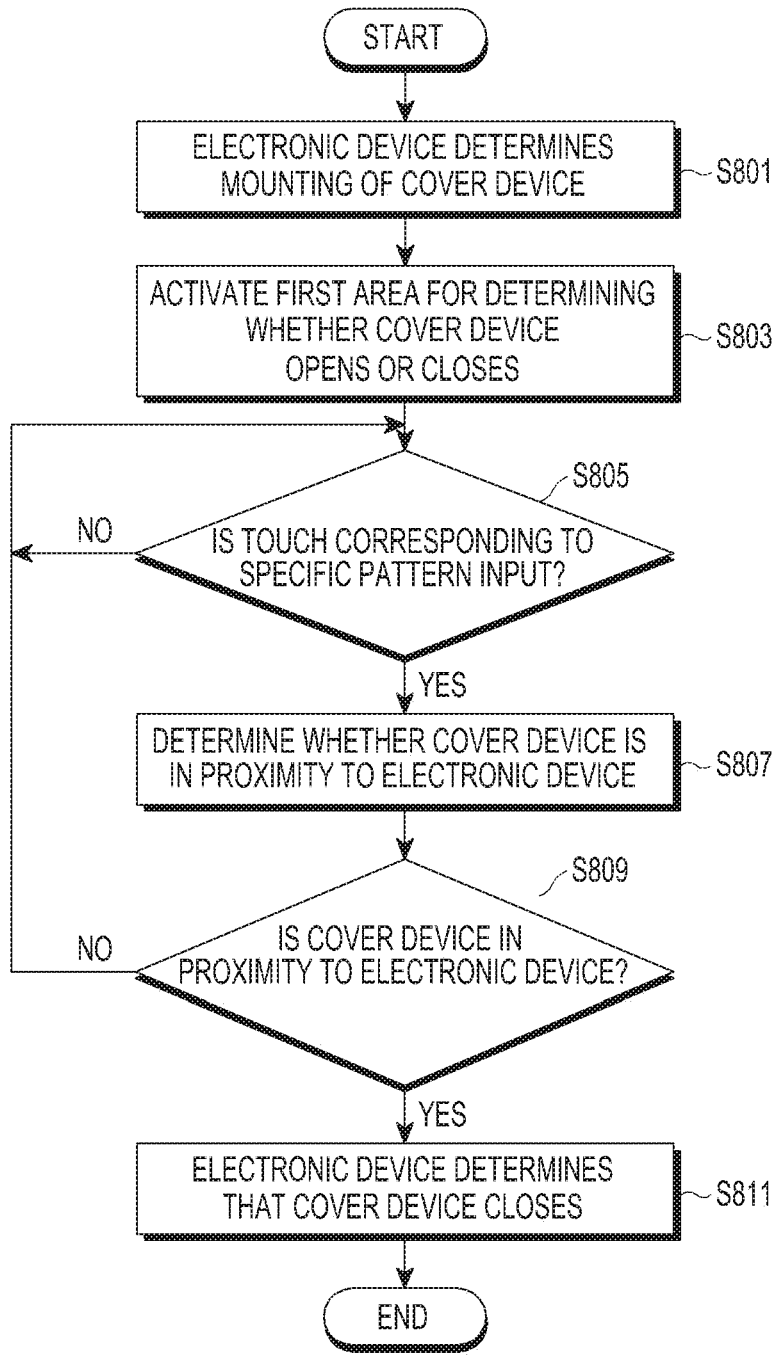
FIG. 8 is a flowchart illustrating an operation of detecting closing of the cover device according to various embodiments of the present disclosure.

FIG. 8 is a flowchart illustrating an operation of detecting closing of the cover device according to various embodiments of the present disclosure.

Referring to FIG. 8, the processor 420 may determine whether the cover device 470 is mounted to the electronic device 401 through the first communication module 430 in operation S801.

When the cover device 470 is mounted to the electronic device 401, the processor 420 may activate the first area 447 to detect opening and closing of the cover device 470 in operation S803. For example, the processor 420 may activate the first area 447 corresponding to the cover device 470 or the specific pattern included in the cover device 470. At this time, the processor 420 may activate the touch panel of the touch screen 445 corresponding to the first area 447. Further, when it is not yet determined whether the cover device 470 opens or closes, the processor 420 may activate the entire touch panel of the touch screen 445.

The processor 420 may determine whether a touch corresponding to the specific pattern is input at operation S805. For example, the processor 420 may set a location of the first area 447 corresponding to the specific pattern based on ID received from the cover device 470. The processor 420 may determine whether a touch input corresponding to the specific pattern is made at the location set within the first area 447.

Further, the processor 420 may sense a capacitance change (or a capacitance change amount) corresponding to the touch input for the specific pattern and determine whether a touch corresponding to the specific pattern is input based on the sensed capacitance change (or capacitance change amount).

When a touch corresponding to the specific pattern is input (Yes at operation S805), the processor 420 may determine whether the cover device 470 is in proximity to the electronic device 401 through the sensor 450 at operation S807.

For example, when a touch corresponding to the specific pattern is input, the processor 420 may transmit an IN for activating the sensor 450 to the sensor 450. The processor 420 may determine whether the first cover part of the cover device 470 is in proximity to the electronic device 401 through the activated sensor 450.

In some embodiments, the processor 420 may compare SI, (for example, a proximity signal) acquired through the sensor 450, with a RI for proximity and determine whether the cover device 470 is in proximity to the electronic device 401 based on the result of the comparison. For example, when the proximity signal included in the SI is greater than the RI, the processor 420 may determine that the cover device 470 is in proximity to the electronic device 401. At this time, the RI may be determined by the processor 420 or the user depending on the type of the electronic device 401 and the cover device 470.

When a touch corresponding to the specific pattern is not input (No at operation S805), the processor 420 may continuously monitor whether a touch corresponding to the specific pattern is input in the first area 447. At this time, the processor 420 may maintain the operational state of the first cover part 480 of the cover device 470 and the electronic device 401. For example, when the electronic device 401 operates in the active mode, the processor 420 may maintain the existing active mode.

When the cover device 470 is in proximity to the electronic device 401 (Yes at operation S809), the processor 420 may determine that the first cover part 480 of the cover device 470 closes at operation S811.

On the other hand, when the cover device 470 is not in proximity to the electronic device 401 (No at operation S809), the processor 420 may determine that the first cover part 480 of the cover device 470 is not closed. The processor 420 may continuously monitor whether a touch corresponding to the specific pattern is input on the first area 447. At this time, the processor 420 may maintain the operational state of the first cover part 480 of the cover device 470 and the electronic device 401.

Figure 9:
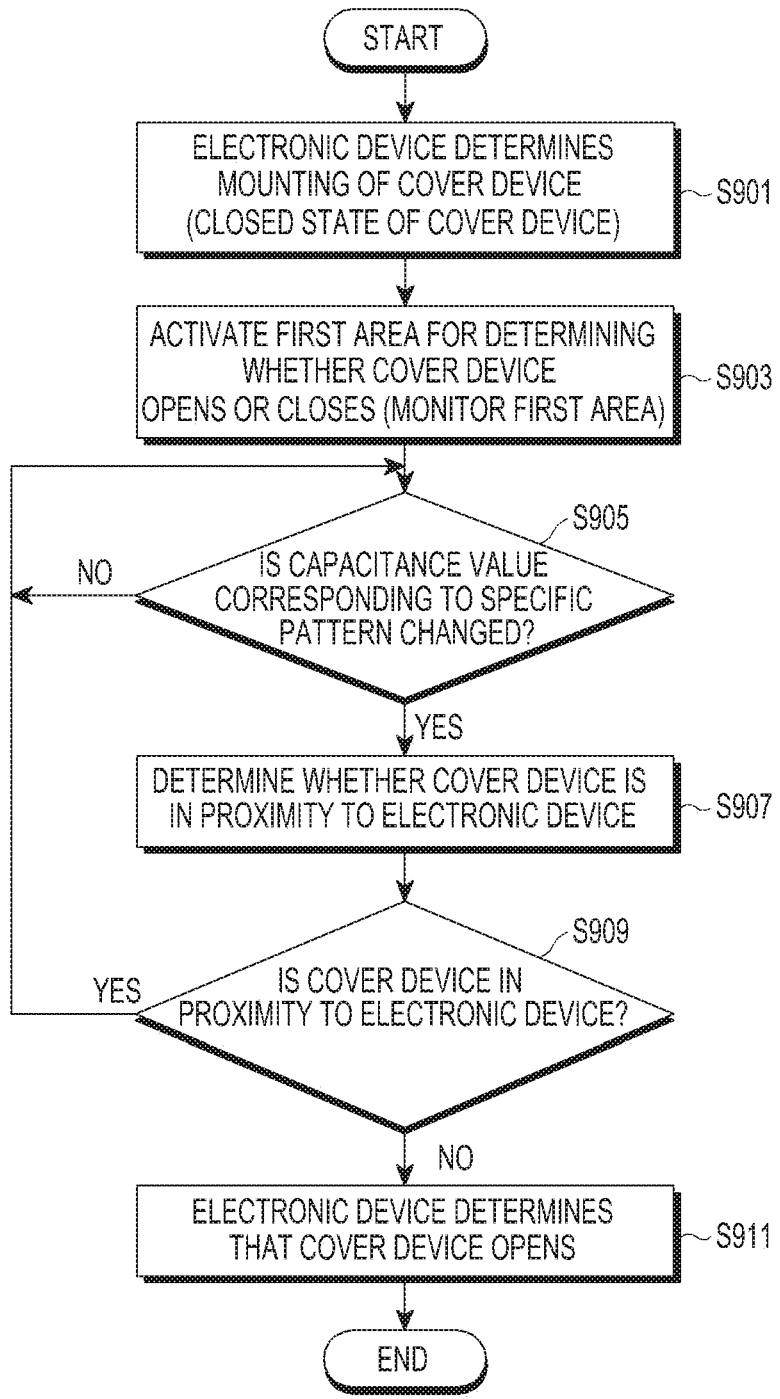
FIG. 9 is a flowchart illustrating an operation of detecting opening of the cover device according to various embodiments of the present disclosure.

FIG. 9 is a flowchart illustrating an operation of detecting opening of the cover device according to various embodiments of the present disclosure.

Referring to FIG. 9, the processor 420 may determine whether the cover device 470 is mounted to the electronic device 401 through the first communication module 430 at operation S901. For example, the processor 420 may determine that the first cover part 480 closes over the electronic device 401 through the touch screen 445 and the sensor 450 at operation S901.

When the first cover part 480 closes over the electronic device 401, the processor 420 may activate only the first area 447 to detect opening and closing of the cover device 470 at operation S903. For example, the processor 420 may activate only the first area 447 corresponding to the cover device 470 or the specific pattern included in the cover device 470. That is, the processor 420 may operate the electronic device 401 in the power-saving mode. Further, the processor 420 may monitor whether a capacitance change is generated in the first area 447.

The processor 420 may determine a change in a capacitance value corresponding to the specific pattern for the first area 447 at operation S905. For example, the processor 420 may determine whether a capacitance change corresponding to the touch input for the specific pattern is generated.

When a touch input corresponding to the specific pattern is changed (Yes at operation S905), the processor 420 may determine whether the cover device 470 is in proximity to the electronic device 401 through the sensor 450 at operation S907.

For example, when a touch input corresponding to the specific pattern is changed, the processor 420 may transmit an IN for activating the sensor 450 to the sensor 450. The processor 420 may determine whether the first cover part of the cover device 470 is in proximity to the electronic device 401 through the activated sensor 450.

In some embodiments, the processor 420 may compare SI (for example, a proximity signal), acquired through the sensor 450, with a (RI for proximity and determine whether the cover device 470 is in proximity to the electronic device 401 based on a result of the comparison. For example, when the proximity signal included in the SI is smaller than the RI, the processor 420 may determine that the cover device 470 is not in proximity to the electronic device 401.

When the cover device 470 is not in proximity to the electronic device 401 (No at operation S909), the processor 420 may determine that the first cover part 480 of the cover device 470 opens at operation S911.

On the other hand, when the cover device 470 is in proximity to the electronic device 401 (Yes at operation S909), the processor 420 may determine that the first cover part 480 of the cover device 470 does not open and/or that the first cover part 480 is tilted. Further, when the cover device 470 is in proximity to the electronic device 401 (Yes at operation S909), the processor 420 may continuously monitor whether a change in the capacitance value is generated in the first area 447.

Figure 10:
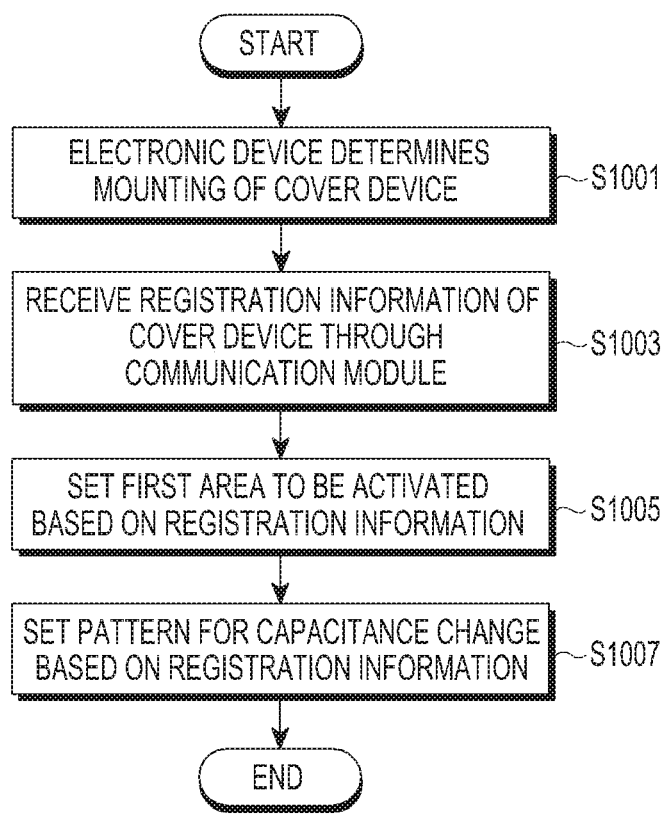
FIG. 10 is a flowchart illustrating a method of operating the electronic device that receives registration information (ID) from the cover device according to various embodiments of the present disclosure.

FIG. 10 is a flowchart illustrating a method of operating the electronic device that receives ID from the cover device according to various embodiments of the present disclosure.

Referring to FIG. 10, the processor 420 may determine whether the cover device 470 is mounted to the electronic device 401 through the first communication module 430 at operation S1001.

The processor 420 may receive ID of the cover device 470 from the second communication module 442 of the cover device 470 through the first communication module 430 at operation S1003. For example, when the first communication module 430 and the second communication module 442 are located within a short range, the processor 420 may acquire ID through the first communication module 430.

The processor 420 may set the first area 447 to be activated on the touch screen 445 based on the ID at operation S1005. For example, the processor 420 may determine an area for activating the touch panel of the touch screen 445 based on the location or size of the specific pattern included in the ID.

The processor 420 may set a CI for a capacitance change to detect opening and closing of the cover device 470 based on the ID at operation S1007.

The processor 420 may sense a touch input of the specific pattern for the first area 447 of the cover device 470 and compare a capacitance change corresponding to the touch input with the CI. The processor 420 may detect opening and closing of the cover device 470 based on a result of the comparison.

Figure 11:
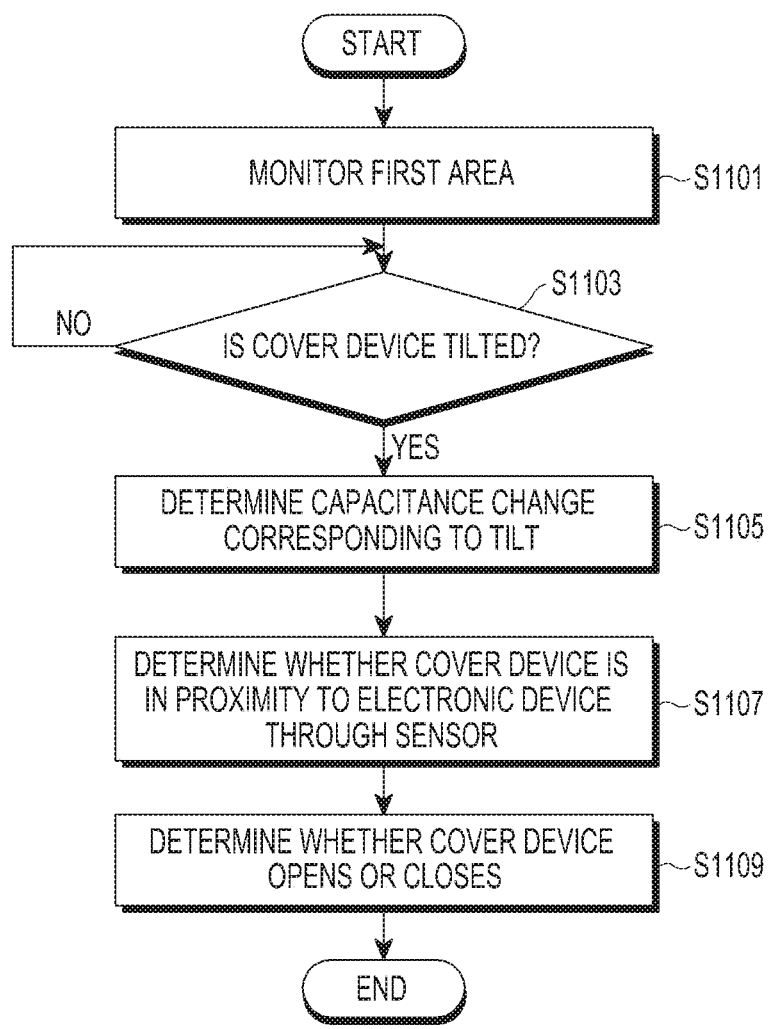
FIG. 11 is a flowchart illustrating a method of operating the electronic device when the cover device is tilted according to various embodiments of the present disclosure.

FIG. 11 is a flowchart illustrating a method of operating the electronic device when the cover device is tilted according to various embodiments of the present disclosure.

Referring to FIG. 11, in the state in which the first cover part 480 of the cover device 470 closes over the electronic device 401, the touch of the specific pattern may be input into the first area 447 at operation S1101.

When the cover device 470 is tilted with respect to the electronic device 401 (Yes at operation S1103), the touch input of the specific pattern for the first area 447 may be changed.

Accordingly, when the cover device 470 is tilted with respect to the electronic device 401 (Yes at operation S1103), the processor 420 may receive a touch input corresponding to the tilted specific pattern through the first area 447. Further, the processor 420 may acquire a capacitance change value for the tilt.

For example, when the cover device 470 is tilted with respect to the electronic device 401, the processor 420 may determine a capacitance change for areas within a predetermined range based on the center area of the first area 447 at operation S1105. For example, the processor 420 may determine whether a touch input is sensed in another area of the first area 447 located at relative distances for respective patterns from the center area of the first area 447 and determine whether the cover device 470 opens or closes based on the result of the determination. That is, the processor 420 may determine whether the touch input is sensed in particular areas within a predetermined range from the center area of the first area 447 and determine whether the cover device 470 opens or closes and is tilted based on the result of the determination.

When it is determined that the cover device 470 is tilted (for example, a capacitance change is sensed both in a center area and in another area), the processor 420 may determine whether the cover device 470 is in proximity to the electronic device 401 through the sensor 450 at operation S1107. For example, the processor 420 may transmit an IN for activating the sensor 450 to the sensor 450. The processor 420 may determine whether the first cover part of the cover device 470 is in proximity to the electronic device 401 through the activated sensor 450.

Even if it is determined that the cover device 470 opens (for example, a capacitance change is sensed neither in a center area nor in another area), the processor 420 may determine whether the cover device 470 is in proximity to the electronic device 401 through the sensor 450 at operation S1107.

When the first cover part 480 of the cover device 470 is not tilted with respect to the electronic device 401 (No at operation S1103), the processor 420 may continuously monitor the first area 447.

The processor 420 may detect opening and closing of the cover device 470 based on the touch input of the specific pattern sensed in the first area 447 and whether the cover device 470 is in proximity to the electronic device 401 sensed through the sensor 450 at operation S1109.

Figure 12:
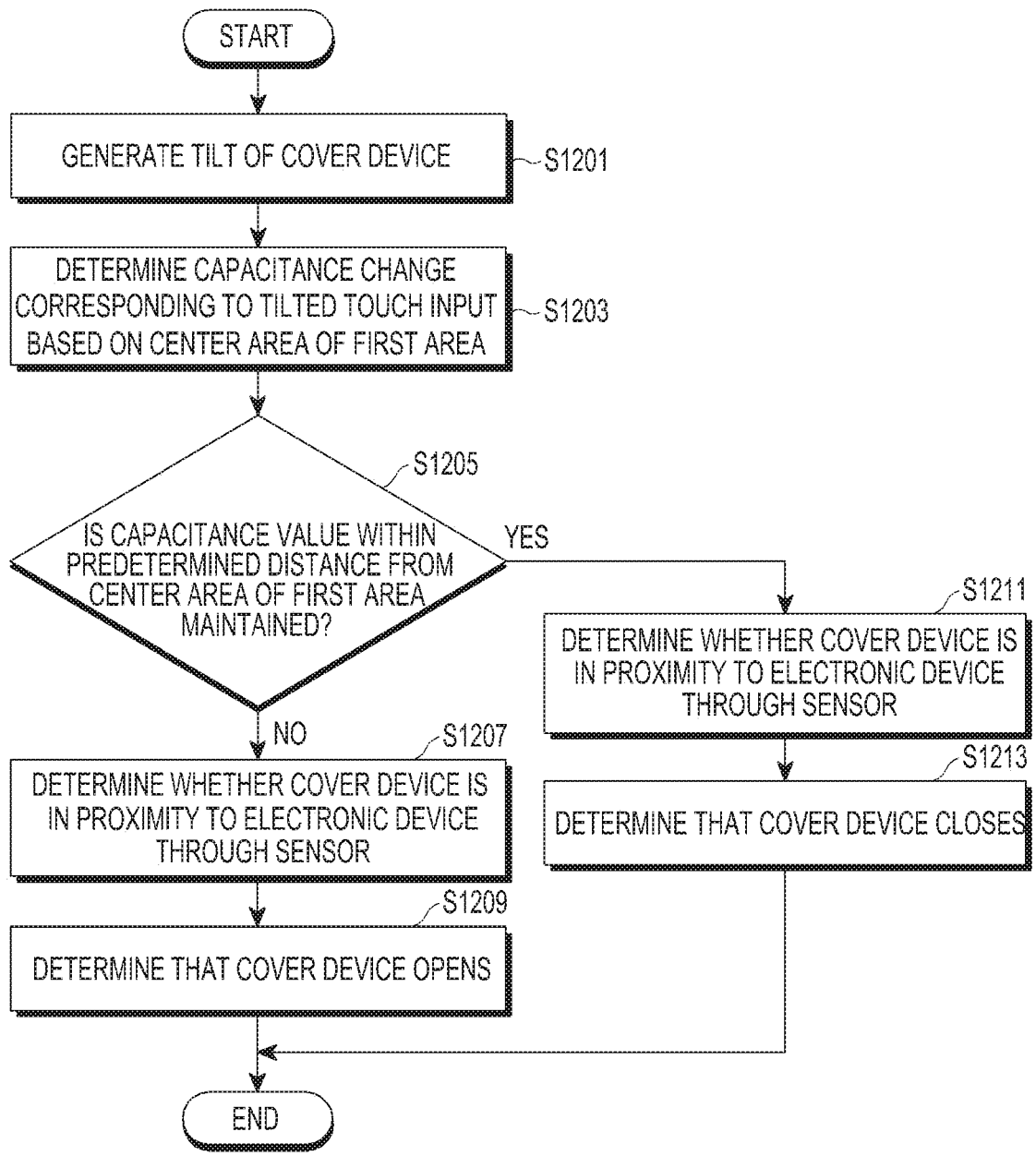
FIG. 12 is a flowchart illustrating a method of operating the electronic device when the cover device is tilted according to various embodiments of the present disclosure.

FIG. 12 is a flowchart illustrating a method of operating the electronic device when the cover device is tilted according to various embodiments of the present disclosure.

Referring to FIG. 12, the cover device 470 may be tilted with respect to the electronic device 401 at operation S1201.

The processor 420 may determine a capacitance change corresponding to the tilted touch input based on a center area of the first area 447 at operation S1203.

The processor 420 may determine whether the touch input (or capacitance value) is maintained in portions of other areas of the first area 447 located at relative distances for respective patterns from the center area of the first area 447 at operation S1205.

When the capacitance change is not maintained in the portions of other areas of the first area 447 located at relative distances for respective patterns from the center area of the first area 447 (No of operation S1205), the processor 420 may determine whether the cover device 470 is in proximity to the electronic device 401 through the sensor 450 at operation S1207.

When it is determined that the cover device 470 is not in proximity to the electronic device 401, the processor 420 may determine that the cover device 470 opens at operation S1209. Accordingly, the processor 420 may activate the electronic device 401 (or may activate the entire touch panel of the touch screen 445). For example, the processor 420 may operate the electronic device 401 in the active mode.

When the capacitance change is maintained in portions of other areas located at relative distances for respective patterns from the center area of the first area 447 (Yes of operation S1205), the processor 420 may determine whether the cover device 470 is in proximity to the electronic device 401 through the sensor 450 at operation S1211.

When it is determined that the cover device 470 is in proximity to the electronic device 401, the processor 420 may determine that the cover device 470 closes at operation S1213. Accordingly, the processor 420 may not activate the entire area (or the touch panel of the entire area) of the touch screen 445 of the electronic device 401, like the state in which the cover device 470 opens. For example, the processor 420 may operate the electronic device 401 in the power-saving mode, in which only the touch panel in the first area 447 is activated.

Figure 13:
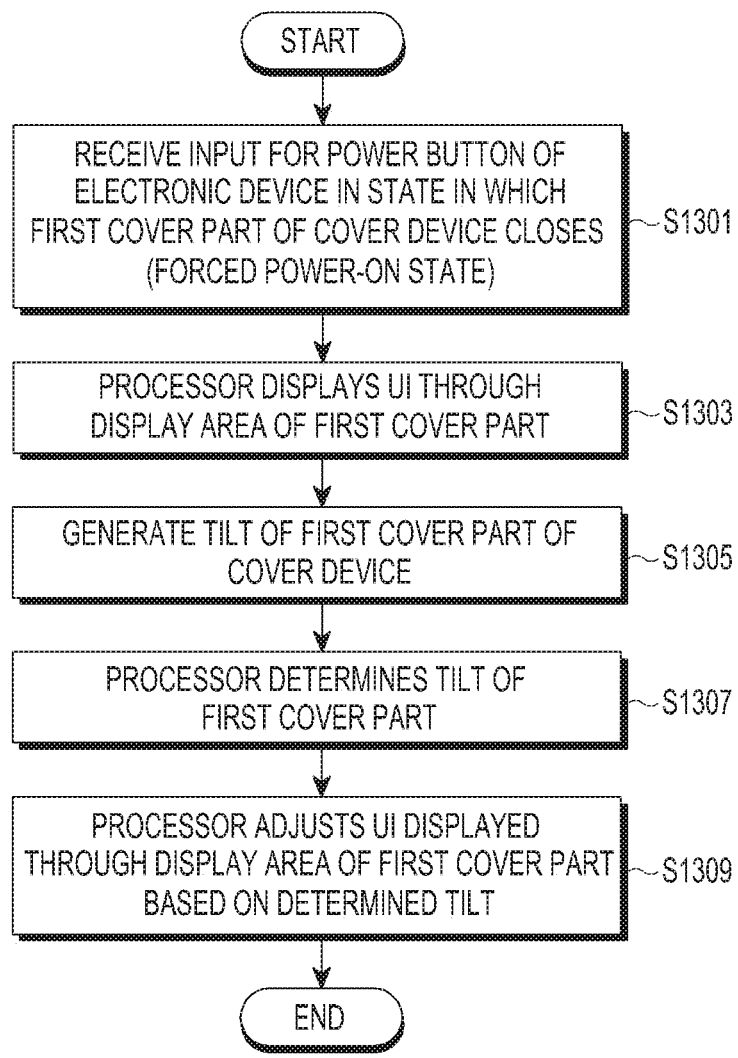
FIG. 13 is a flowchart illustrating a method of operating the electronic device when the cover device is tilted according to various embodiments of the present disclosure.

FIG. 13 is a flowchart illustrating a method of operating the electronic device when the cover device is tilted according to various embodiments of the present disclosure.

Referring to FIG. 13, the electronic device 401 may mount the cover device 470. For example, the first cover part 480 of the cover device 470 may be in a closed state over the electronic device 401.

The processor 420 may forcibly power on the electronic device 401 in response to an input signal made through an input module at operation S1301. For example, the processor 420 may receive input via a power button of the electronic device 401 and operate the electronic device 401 in an activated state while the electronic device 401 is closed. For example, the term "activated state" may mean the state in which the electronic device 401 switches from the power-saving mode to the active mode.

When the electronic device 401 switches to the active mode, the processor 420 may display a user interface (or an image) through a display area of the first cover part 480 at operation S1303.

The first cover part 480 of the cover device 470 may be tilted with respect to the electronic device 401 by an external impact (or a physical impact) at operation S1305.

When the first cover part 480 is tilted with respect to the electronic device 401, the processor 420 may determine whether the first cover part is tilted at operation S1307. That is, the processor 420 may determine that the first cover part 480 closes even though the first cover part 480 is tilted.

The processor 420 may adjust a user interface (or an image) displayed through the display area of the first cover part 480 according to the tilt of the first cover part 480 at operation S1309.

For example, the processor 420 may adjust a direction and an inclination of the user interface (or image) displayed in the display area of the first cover part 480 according to the tilted direction and inclination of the first cover part 480.

Figure 14A:
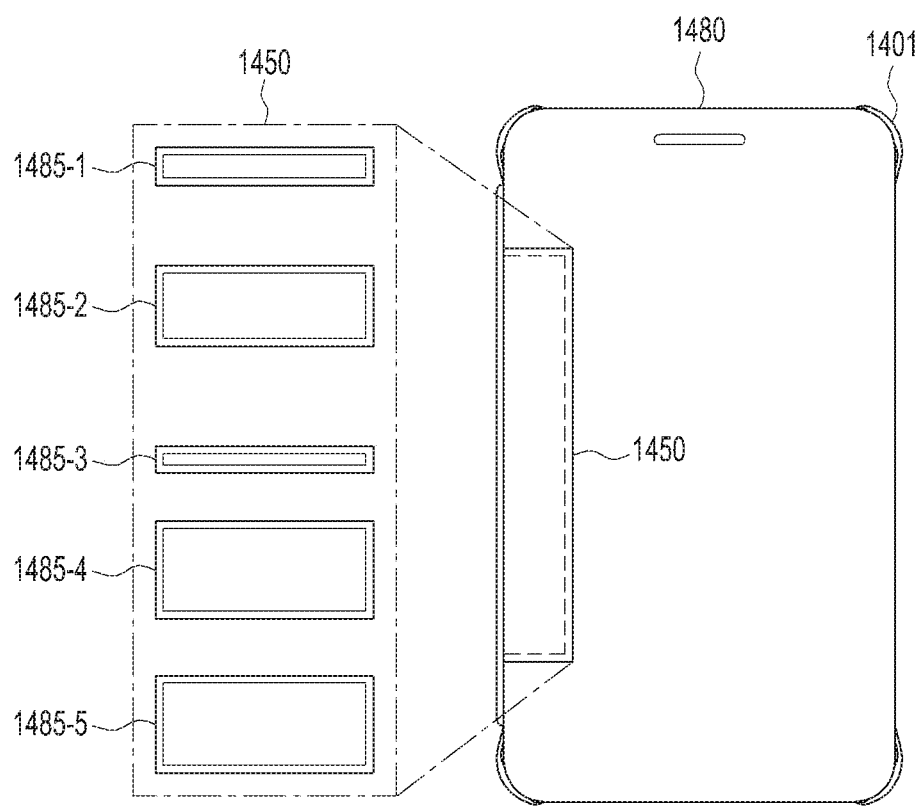
FIGS. 14A and 14B are block diagrams illustrating the operation of the electronic device when the cover device is tilted according to various embodiments of the present disclosure.
Figure 14B:
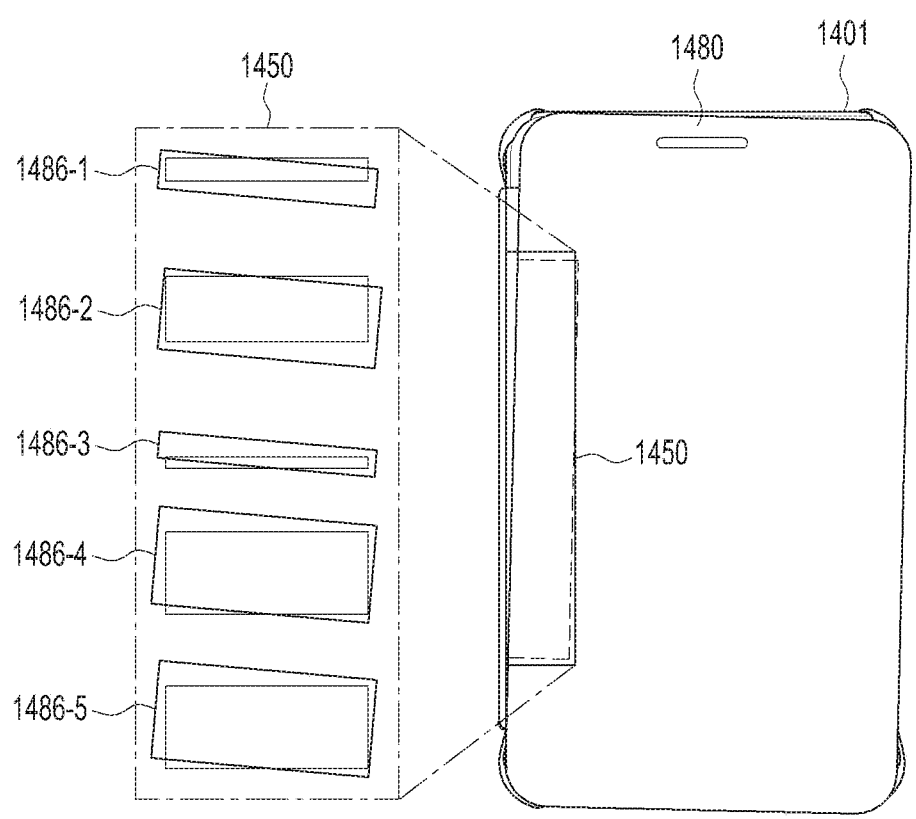

FIGS. 14A and 14B are block diagrams illustrating the operation of the electronic device when the cover device is tilted according to various embodiments of the present disclosure.

Referring to FIGS. 14A and 14B, the electronic device 1401 may be implemented to be substantially the same as or similar to the electronic device 401 described through FIG. 3.

FIG. 14A illustrates the state in which a first cover part 1480 of the cover device 470 is not tilted with respect to the electronic device 401 according to an embodiment of the present disclosure.

Referring to FIG. 14A, the cover device 470 may be mounted to the electronic device 1401, and the first cover part 1480 may close without being tilted with respect to the electronic device 1401.

When the first cover part 1480 is not tilted with respect to the electronic device 1401, touch inputs 1485-1 to 1485-5 corresponding to the specific pattern may be sensed in a first area 1450.

For example, the processor 420 may compare the touch inputs 1485-1 to 1485-5 corresponding to the specific pattern with a CI in the first area 1450. When the first cover part 1480 is not tilted with respect to the electronic device 1401, the processor 420 may determine that the touch inputs 1485-1 to 1485-5 corresponding to the specific pattern match the CI.

FIG. 14B illustrates the state in which the cover device 470 is tilted with respect to the electronic device 401.

Referring to FIG. 14B, the cover device 470 is mounted to the electronic device 1401, and the first cover part 1480 may close while being tilted with respect to the electronic device 401.

When the first cover part 1480 is tilted with respect to the electronic device 401, touch inputs 1486-1 to 1486-5 corresponding to the specific pattern may be sensed in the first area 1450.

For example, the processor 420 may compare the touch inputs 1486-1 to 1486-5 corresponding to the specific pattern with a CI in the first area 1450. When the first cover part 1480 is tilted with respect to the electronic device 401, the processor 1420 may determine that the touch inputs 1486-1 to 1486-5 corresponding to the specific pattern do not match the CI.

When the first cover part 1480 is tilted with respect to the electronic device 1401, the processor 420 may determine that the touch inputs 1486-1 to 1486-5 corresponding to the specific pattern do not match CI. At this time, for the tilt operation, the processor 420 may determine touch inputs (or capacitance changes corresponding to the touch inputs) of the specific pattern sensed in a center area 1485-3 of the first area 1450 and other areas.

FIGS. 15A, 15B, 15C, and 15D are block diagrams illustrating the operation of the electronic device when the cover device is tilted according to various embodiments of the present disclosure.

Referring to FIGS. 15A to 15D, an electronic device 1501 may be implemented to be substantially the same as or similar to the electronic device 401 described with reference to FIG. 3.

Figure 15A:
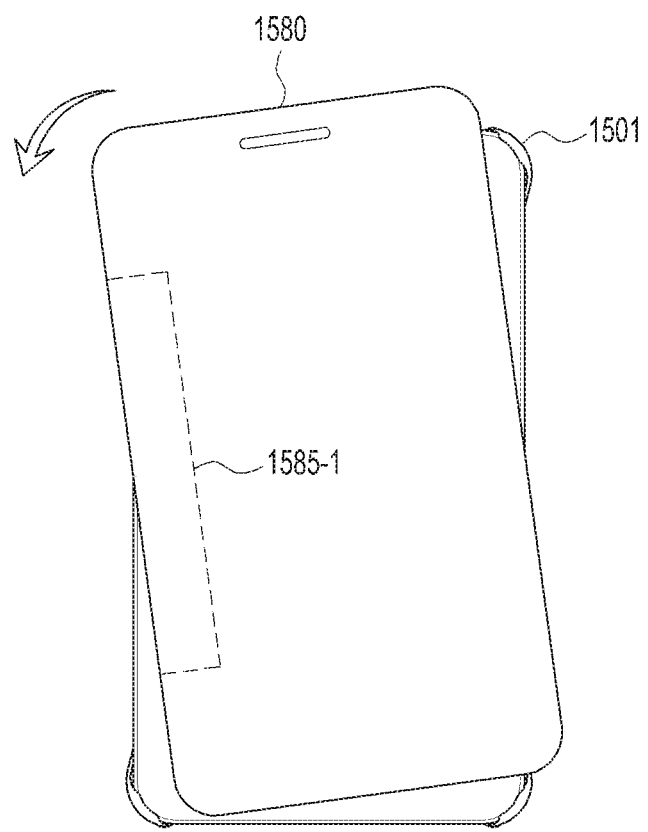
FIGS. 15A, 15B, 15C, and 15D are block diagrams illustrating the operation of the electronic device when the cover device is tilted according to various embodiments of the present disclosure.
Figure 15B:
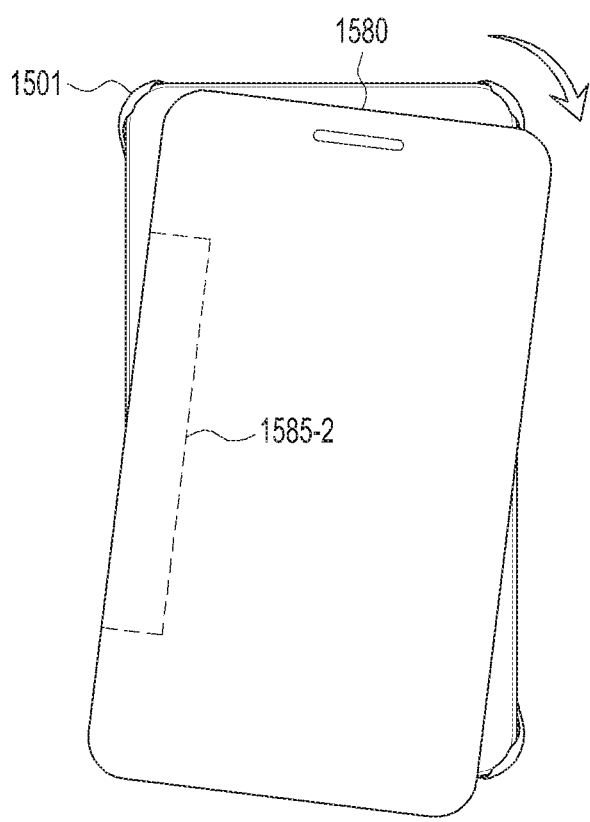

FIGS. 15A and 15B illustrate the state in which the cover device 470 is tilted with respect to an electronic device 1501 in a leftward direction according to an embodiment of the present disclosure.

Referring to FIG. 15A, the cover device 470 may be mounted to the electronic device 1501, and a first cover part 1580 may close while being tilted with respect to the electronic device 1501 in a leftward direction.

When the cover device 470 is tilted with respect to the electronic device 1501 in a leftward direction, a specific pattern 1585-1 of the first cover part 1580 may be rotated in the leftward direction.

Referring to FIG. 15B, the processor 420 may perform an operation of sensing a touch input (a capacitance change corresponding to the touch input) of the specific pattern tilted in the leftward direction.

In some embodiments, the processor 420 may divide the first area 1447 into a plurality of areas. For example, the processor 420 may divide the first area 1447 into a first sub area 1447-1, a second sub area 1447-2, and a third sub area 1447-3.

The processor 420 may detect opening and closing of the cover device 1580 based on capacitance changes of areas (for example, the second sub area 1447-2 or the third sub area 1447-3) within a predetermined range from a center area (for example, the first sub area 1447-1) of the first area 1447.

When the first cover part 1580 is tilted with respect to the electronic device 1501 in a leftward direction, the processor 420 may sense a capacitance change for the third sub area 1447-3 within a predetermined range from the first sub area 1447-1. That is, when the first cover part 1580 is tilted with respect to the electronic device 1501 in the leftward direction, the processor 420 may sense the capacitance change for the first sub area 1447-1 and the third sub area 1447-3 and detect opening and closing of the cover device 470 based on the sensed capacitance change.

Figure 15C:
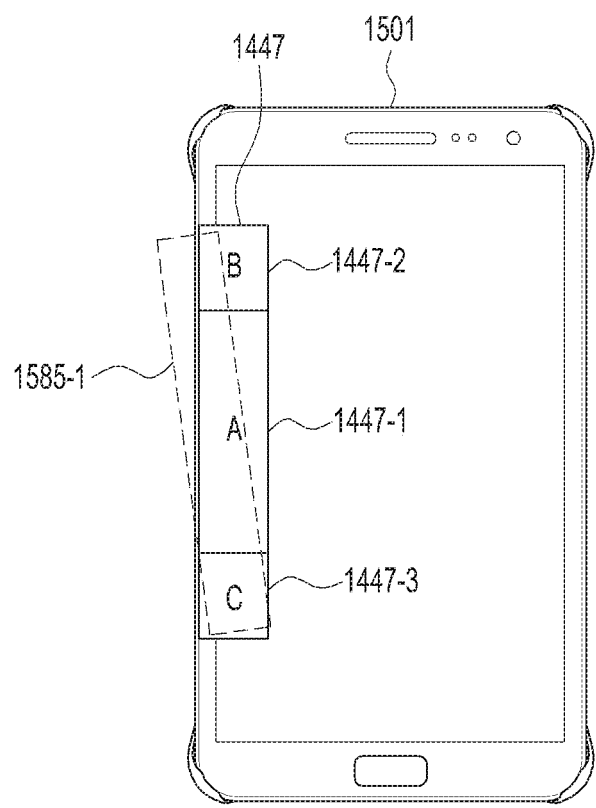
Figure 15D:
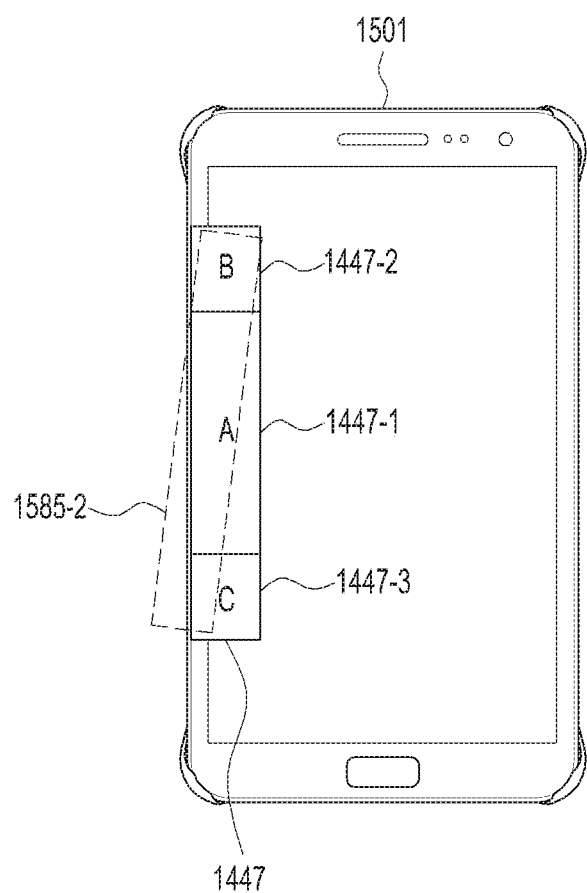

FIGS. 15C and 15D illustrate the state in which the cover device 470 is tilted with respect to the electronic device 1501 in a rightward direction according to an embodiment of the present disclosure.

Referring to FIG. 15C, the cover device 470 may be mounted to the electronic device 1501, and the first cover part 1580 may close while being tilted with respect to the electronic device 1501 in a rightward direction.

When the first cover part 1580 is tilted with respect to the electronic device 1501 in a rightward direction, a specific pattern 1585-2 of the first cover part 1580 may also be rotated in the rightward direction.

Referring to FIG. 15D, the processor 420 may perform an operation of sensing a touch input (capacitance change corresponding to the touch input) of the specific pattern tilted in the rightward direction.

The processor 420 may detect opening and closing of the cover device 1580 based on capacitance changes of areas (for example, the second sub area 1447-2 or the third sub area 1447-3) within a predetermined range from a center area (for example, the first sub area 1447-1) of the first area 1447.

When the first cover part 1580 is tilted with respect to the electronic device 1501 in the rightward direction, the processor 420 may sense a capacitance change for the second sub area 1447-2 within a predetermined range from the first sub area 1447-1. That is, when the first cover part 1580 is tilted with respect to the electronic device 1501 in the rightward direction, the processor 420 may sense the capacitance change for the first sub area 1447-1 and the second sub area 1447-2 and detect opening and closing of the cover device 1580 based on the sensed capacitance change.

Figure 16A:
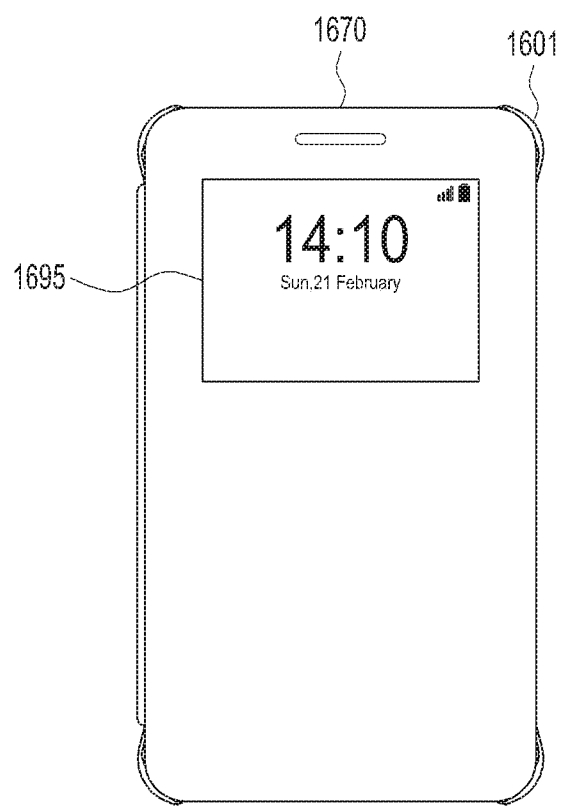
FIGS. 16A, 16B, and 16C are block diagrams illustrating the operation of the electronic device when the cover device is tilted according to various embodiments of the present disclosure.
Figure 16B:
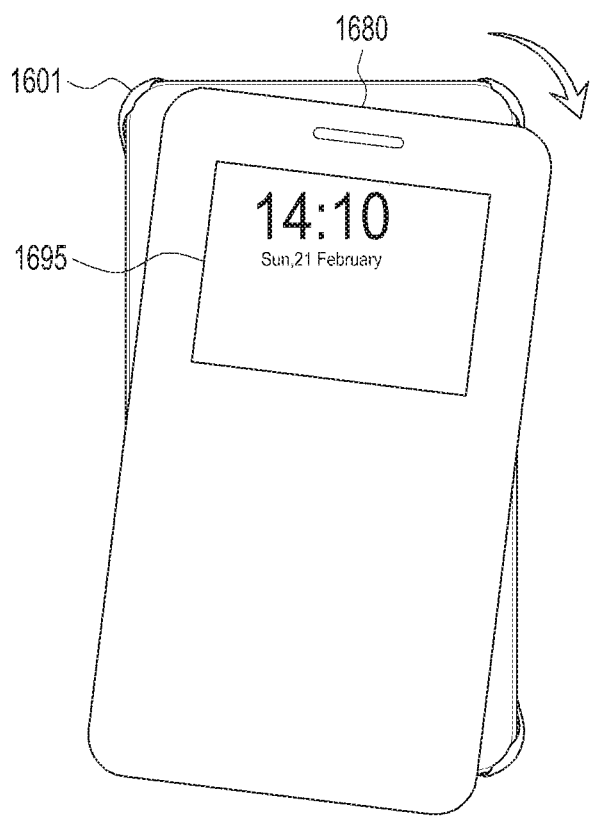
Figure 16C:
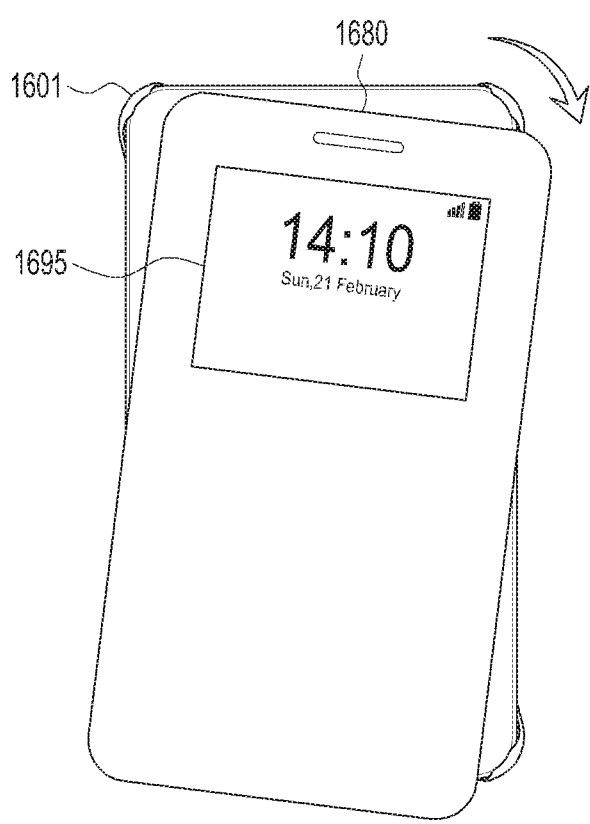

FIGS. 16A, 16B, and 16C are block diagrams illustrating the operation of the electronic device when the cover device is tilted according to various embodiments of the present disclosure.

Referring to FIG. 16A, an electronic device 1601 may mount a cover device 1670. For example, the electronic device 1601 and the cover device 1670 may be implemented to be substantially the same as or similar to the electronic device 401 and the cover device 470 described through FIG. 3A.

The electronic device 1601 may mount the cover device 1670. For example, a first cover part 1680 of the cover device 1670 may be in a closed state over the electronic device 1601.

The cover device 1680 may include a display cover 1695. For example, the display cover 1695 may be included in the first cover part.

In some embodiments, the display cover 1695 may be implemented as a transparent cover. At this time, the display cover 1695 may display a user interface through the display of the electronic device 1601.

Further, the display cover 1695 may include a separate display device. At this time, the display cover 1695 may display a user interface through the separate display device.

The processor 420 may forcibly power on the electronic device 1601 in response to an input signal made through an input module. At this time, the processor 420 may display the user interface through the display cover 1695.

Referring to FIG. 16B, the first cover part 1680 of the cover device 1670 may be tilted with respect to the electronic device 1601. For example, the first cover part 1680 may be tilted with respect to the electronic device 1601 by an external force or an external impact (or physical impact). The first cover part 1680 may be tilted with respect to the electronic device 1601 in an upward, downward, leftward, or rightward direction.

When the first cover part 1680 is tilted with respect to the electronic device 1601, the display cover 1695 may also be tilted with respect to the electronic device 1601. At this time, the user interface displayed through the display cover 1695 may also be displayed in a tilted state.

Referring to FIG. 16C, when the first cover part 1680 is tilted with respect to the electronic device 1601, the processor 420 may determine whether the first cover part 1680 is tilted. That is, the processor 420 may determine that the first cover part 1680 closes over the electronic device 1601 even though the first cover part 1680 is tilted.

The processor 420 may adjust and display the user interface displayed on the display cover 1695 of the first cover part 1680 according to the tilting of the first cover part 1680. For example, the processor 420 may adjust the direction and inclination of the user interface displayed through the display cover 1695 according to the tilted direction and inclination of the first cover part 1680.

For example, the processor 420 may determine a tilt level (for example, a tilted direction and inclination) of the first cover part 1680 based on a change in a capacitance pattern input by the specific pattern.

For example, when the first cover part 1680 is tilted with respect to the electronic device 1601 at 30 degrees in a rightward direction, the processor 420 may determine that the first cover part 1680 is tilted at 30 degrees in the rightward direction based on a change in a capacitance pattern input by the specific pattern.

Meanwhile, when the first cover part 1680 is tilted, the processor 420 may identify opening and closing of the first cover part 1680 through the sensor 450. That is, when the first cover part 1680 is tilted, the processor 420 may determine that the first cover part 1680 closes based on SI acquired through the sensor 450.

The processor 420 may adjust a direction and an inclination of the user interface displayed through the display cover 1695 according to information on the tilted first cover part 1680 and display the adjusted user interface through the display cover 1695. For example, when the first cover part 1680 is tilted with respect to the electronic device 1601 at 30 degrees in the rightward direction, the processor 420 may adjust the direction and the inclination of the displayed user interface by 30 degrees in the rightward direction and display the adjusted user interface through the display cover 1695.

An electronic device according to various embodiments of the present disclosure may include a sensor, a touch screen, and a processor that activates a first area corresponding to at least a part of the touch screen for determining whether a cover device mounted to the electronic device opens or closes, and determines whether the cover device opens or closes based on a touch input corresponding to a specific pattern included in the cover device sensed through the activated first area of the touch screen and based on information on whether the cover device is in proximity to the electronic device, sensed through the sensor.

The processor may determine whether the cover device opens or closes based on a capacitance change corresponding to the touch input of the specific pattern of the cover device.

The processor may determine whether the cover device opens or closes based on a location of the first area in which the specific pattern is sensed and a capacitance change amount for the location.

The processor may determine whether the cover device opens or closes based on capacitance changes for areas within a predetermined range from a center part of the first area of the touch screen.

The electronic device may further include a communication module, and the processor may activate the first area of the touch screen based on ID of the cover device received through the communication module.

The processor may set a CI for a capacitance change corresponding to the touch input based on ID of the cover device received through the communication module.

The processor may determine that the cover device closes over the electronic device when the capacitance change corresponding to the touch input in the first area matches the CI or when a proximity signal corresponding to proximity of the cover device is greater than or equal to a RI through the sensor.

The processor may determine that the cover device opens over the electronic device when the capacitance change corresponding to the touch input in the first area does not match the CI or when a proximity signal corresponding to proximity of the cover device is equal to or smaller than a RI through the sensor.

The touch input of the specific pattern may be generated by a capacitive material of the specific pattern included in the cover device.

The cover device may include a first cover part corresponding to a first side of the electronic device, a second cover part mounted to a second side of the electronic device, and a connection part that connects the first cover part and the second cover part, and the first cover part may include a capacitive material of the specific pattern, and a partial area of the first cover part may include an opaque area for sensing proximity of the first cover part through the sensor.

A method of operating an electronic device according to various embodiments of the present disclosure may include an operation of activating a first area corresponding to at least a part of a touch screen included in the electronic device for determining whether a cover device mounted to the electronic device opens or closes, an operation of sensing a touch input corresponding to a specific pattern included in the cover device through the activated first area of the touch screen, an operation of determining whether the cover device is in proximity to the electronic device through a sensor included in the electronic device, and an operation of determining whether the cover device opens or closes based on the touch input and based on whether the cover device is in proximity to the electronic device.

The operation of determining whether the cover device opens or closes may include an operation of determining whether the cover device opens or closes based on a capacitance change corresponding to the touch input of the specific pattern of the cover device.

The operation of determining whether the cover device opens or closes may include an operation of determining whether the cover device opens or closes based on a location of the first area in which the specific pattern is sensed and a capacitance change amount for the location.

The operation of determining whether the cover device opens or closes may include an operation of determining whether the cover device opens or closes based on capacitance changes for areas within a predetermined range from a center part of the first area of the touch screen.

The operation of activating the first area of the touch screen may include an operation of receiving ID of the cover device through a communication module of the electronic device and an operation of activating the first area of the touch screen based on the ID.

The operation of activating the first area of the touch screen may include an operation of receiving ID of the cover device through a communication module of the electronic device and an operation of setting a CI for a capacitance change corresponding to the touch input based on ID.

The operation of determining whether the cover device opens or closes may include an operation of determining that the cover device closes over the electronic device when a capacitance change corresponding to the touch input in the first area matches the CI or when a proximity signal corresponding to proximity of the cover device is greater than or equal to a ID through the sensor.

The operation of determining whether the cover device opens or closes may include an operation of determining that the cover device opens over the electronic device when the capacitance change corresponding to the touch input in the first area does not match the CI or when a proximity signal corresponding to proximity of the cover device is equal to or smaller than a ID through the sensor.

The touch input of the specific pattern may be generated by a capacitive material of the specific pattern included in the cover device.

A recording medium having a computer program recorded therein according to various embodiments of the present disclosure may store a computer program for executing an operation of activating a first area corresponding to at least a part of a touch screen included in the electronic device for determining whether a cover device mounted to the electronic device opens or closes, an operation of sensing a touch input corresponding to a specific pattern included in the cover device through the activated first area of the touch screen, an operation of determining whether the cover device is in proximity to the electronic device through a sensor included in the electronic device, and an operation of determining whether the cover device opens or closes based on the touch input and on whether the cover device is in proximity to the electronic device.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

While the present disclosure has been shown and described with reference to various embodiments thereof, it will be understood by those skilled in the art that various changes or modified and changed in form and details may be made therein without departing from the spirit and scope of the present disclosure as defined by the appended claims and their equivalents.

What is claimed is:

1. An electronic device comprising:
   a sensor;
   a touch screen; and
   a processor configured to:
      activate a first area of the touch screen, which corresponds to a part of the touch screen that is less than an entire area of the touch screen, for determining whether a cover device mounted to the electronic device opens or closes, wherein the cover device comprises a specific pattern of a capacitive material that is detectable by the touch screen,
      determine whether the cover device opens or closes based on:
         whether an input corresponding to the specific pattern of the capacitive material is sensed through the activated first area of the touch screen, and
         whether the cover device is in proximity to the electronic device based on information sensed through the sensor,
      determine whether the cover device is tilted with respect to the electronic device in accordance with whether the input received through the first area corresponds to the specific pattern being tilted, and
      in response to determining that the cover device is tilted with respect to the electronic device, determine that the cover device is closed with respect to the electronic device.

2. The electronic device of claim 1, wherein the processor is further configured to determine whether the cover device opens or closes based on a capacitance change of the input corresponding to the specific pattern of the cover device sensed by the activated first area of the touch screen.

3. The electronic device of claim 1, wherein the processor is further configured to determine whether the cover device opens or closes based on:

a location within the activated first area in which the specific pattern of the cover device is sensed, and a capacitance change amount sensed at the location within the activated first area.

4. The electronic device of claim 1, wherein the processor is further configured to determine whether the cover device opens or closes based on capacitance changes for areas within a predetermined range from a center part of the activated first area of the touch screen.

5. The electronic device of claim 1, further comprising: a communication module, wherein the processor is further configured to activate the first area of the touch screen based on registration information of the cover device received through the communication module.

6. The electronic device of claim 1, further comprising: a communication module, wherein the processor is further configured to set a reference pattern for a capacitance change corresponding to the input based on registration information of the cover device received through the communication module.

7. The electronic device of claim 6, wherein the processor is further configured to determine that the cover device closes over the electronic device when the capacitance change corresponding to the input in the activated first area matches the reference pattern or when a proximity signal corresponding to proximity of the cover device is greater than or equal to a reference value through the sensor.

8. The electronic device of claim 6, wherein the processor is further configured to determine that the cover device opens over the electronic device, when the capacitance change corresponding to the input in the activated first area does not match the reference pattern or when a proximity signal corresponding to proximity of the cover device is equal to or smaller than a reference value through the sensor.

9. The electronic device of claim 1, wherein the input corresponding to the specific pattern is generated by the capacitive material of the specific pattern included in the cover device.

10. The electronic device of claim 1, wherein the cover device comprises:

a first cover part corresponding to a first side of the electronic device;

a second cover part mounted to a second side of the electronic device; and a connection part that connects the first cover part and the second cover part, wherein the first cover part includes the capacitive material of the specific pattern and a partial area of the first cover part includes an opaque area for sensing proximity of the first cover part through the sensor.

11. A method of operating an electronic device, the method comprising:

activating a first area of a touch screen, which corresponds to a part of the touch screen, which is included in the electronic device, that is less than an entire area of the touch screen, for determining whether a cover device mounted to the electronic device opens or closes, wherein the cover device comprises a specific pattern of a capacitive material that is detectable by the touch screen;

sensing an input, which corresponds to the specific pattern of the capacitive material, through the activated first area of the touch screen;

determining whether the cover device is in proximity to the electronic device through a sensor included in the electronic device; and determining whether the cover device opens or closes based on:

the input on the activated first area, and sensing whether the cover device is in proximity to the electronic device by using the sensor, wherein determining whether the cover device opens or closes further comprises:

determining whether the cover device is tilted with respect to the electronic device in accordance with whether the input received through the first area corresponds to the specific pattern being tilted, and in response to determining that the cover device is tilted with respect to the electronic device, determining that the cover device is closed with respect to the electronic device.

12. The method of claim 11, further comprising determining whether the cover device opens or closes based on a capacitance change of the input corresponding to the specific pattern of the cover device.

13. The method of claim 11, further comprising determining whether the cover device opens or closes based on:

a location within the activated first area in which the specific pattern of the cover device is sensed, and a capacitance change amount sensed at the location within the activated first area.

14. The method of claim 11, further comprising determining whether the cover device opens or closes based on capacitance changes for areas within a predetermined range from a center part of the activated first area of the touch screen.

15. The method of claim 11, wherein the activating of the first area of the touch screen comprises:

receiving registration information of the cover device through a communication module of the electronic device; and activating the first area of the touch screen based on the registration information.

16. The method of claim 11, wherein the activating of the first area of the touch screen comprises:

receiving registration information of the cover device through a communication module of the electronic device; and setting a reference pattern for a capacitance change corresponding to the input based on the registration information.

17. The method of claim 16, further comprising determining that the cover device closes over the electronic device based on the capacitance change corresponding to the input in the activated first area matching the reference pattern or based on a proximity signal corresponding to proximity of the cover device being greater than or equal to a reference value.

18. The method of claim 16, further comprising determining that the cover device opens over the electronic device based on the capacitance change corresponding to the input in the activated first area not matching the reference pattern or based on a proximity signal corresponding to proximity of the cover device being equal to or smaller than a reference value.

19. The method of claim 11, wherein the input of the specific pattern is generated by the capacitive material of the specific pattern included in the cover device.

20. A non-transitory computer-readable medium storing a plurality of instructions for performing a method in an electronic device comprising:
- activating a first area of a touch screen, which corresponds to a part of the touch screen, which is included in the electronic device, that is less than an entire area of the touch screen, for determining whether a cover device mounted to the electronic device opens or closes, wherein the cover device comprises a specific pattern of a capacitive material that is detectable by the touch screen;
- sensing an input, which corresponds to the specific pattern of the capacitive material, through the activated first area of the touch screen;
- determining whether the cover device is in proximity to the electronic device through a sensor included in the electronic device; and
- determining whether the cover device opens or closes based on:
  - the input on the activated first area, and
  - sensing whether the cover device is in proximity to the electronic device by using the sensor,
- wherein determining whether the cover device opens or closes further comprises:
- determining whether the cover device is tilted with respect to the electronic device in accordance with whether the input received through the first area corresponds to the specific pattern being tilted, and
- in response to determining that the cover device is tilted with respect to the electronic device, determining that the cover device is closed with respect to the electronic device.

* * * * *